(12) United States Patent
Akiike et al.

(10) Patent No.: US 6,300,465 B1
(45) Date of Patent: Oct. 9, 2001

(54) PROCESS FOR PRODUCING PHENYLENE-CONTAINING POLYMER AND FILM-FORMING MATERIAL

(75) Inventors: Toshiyuki Akiike; Tadahiro Shiba; Keiji Konno; Igor Rozhanskii; Kohei Goto, all of Ibaraki (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/355,314

(22) PCT Filed: Jan. 29, 1998

(86) PCT No.: PCT/JP98/00357
§ 371 Date: Jul. 30, 1999
§ 102(e) Date: Jul. 30, 1999

(87) PCT Pub. No.: WO98/33836
PCT Pub. Date: Aug. 6, 1998

(30) Foreign Application Priority Data

Jan. 30, 1997 (JP) .................................................. 9-029866
Jan. 31, 1997 (JP) .................................................. 9-031424

(51) Int. Cl.[7] .................................................. C08G 61/10

(52) U.S. Cl. .......................... 528/391; 528/171; 528/174; 528/397

(58) Field of Search ..................................... 528/171, 174, 528/391, 397

(56) References Cited

U.S. PATENT DOCUMENTS 5,545,710 * 8/1996 Haese .
5,756,581 * 5/1998 Marrocco .

FOREIGN PATENT DOCUMENTS

215959 * 9/1987 (JP) .
18076 * 9/1993 (WO) .
28491 * 9/1996 (WO) .

* cited by examiner

Primary Examiner—David J. Buttner
(74) Attorney, Agent, or Firm—Oblon, Spivak, McClelland, Maier & Neustadt, P.C.

(57) ABSTRACT

The present invention is a process for producing a phenylene-containing polymer in the presence of a catalyst system containing a transition metal compound, and a film-forming material comprising the phenylene-containing polymer.

27 Claims, 20 Drawing Sheets

PROCESS FOR PRODUCING PHENYLENE-CONTAINING POLYMER AND FILM-FORMING MATERIAL

TECHNICAL FIELD

This invention relates to an organic solvent-soluble phenylene-containing polymer which has high heat resistance, low dielectric properties, and excellent processability.

BACKGROUND ART

Reflecting the advancement of fine processing technology, large scale integration (LSI) has ever been increasing in integration, function, and performance. As a result, the circuit resistance and condenser capacitance between interconnection lines (called parasitic resistance and parasitic capacitance, respectively) increase to increase not only power consumption but retardation time, which is a great cause of reduction of signal speed of a device.

It has therefore been demanded to reduce parasitic resistance or parasitic capacitance. One of the solutions is to cover the peripheries of interconnection lines with an interlayer dielectric film to reduce the parasitic capacitance so as to cope with speeding up of devices. In this case, the interlayer dielectric film must have excellent heat resistance withstanding a thin film formation step for producing a mounting substrate or post steps, such as chip bonding and pin insertion mounting.

Polyimide is widespread as a highly heat-resistant organic material for this use but, containing a highly polar imido group, unsatisfactory from the standpoint of low dielectric properties and low water absorbability.

On the other hand, polyphenylene is known as a heat-resistant organic material containing no polar group. Because polyphenylene is, while excellent in heat resistance, inferior in solubility in organic solvents, it is a practice generally followed to introduce a side chain. Polyphenylene having a side chain includes polymers described in U.S. Pat. No. 5,214,044, WO 96/28491, and EP 629217.

These polymers have a basic structure mainly comprising a poly-p-phenylene structure and, in some cases, a flexible monomer unit. They are soluble only in specific organic solvents and have poor processability. Besides, many of them carry a polar group or an alkyl group as a side chain and therefore fail to fully satisfy the requirements of heat resistance and low dielectric properties.

Further, most of these conventional polymers are produced by starting with aromatic dichloro compounds such as p-dichlorobenzene derivatives. When a fluoroalkyl group or an aryl group is to be introduced as a side chain in an attempt to obtain a heat-resistant low-dielectric material from such an aromatic dichloro compound, there are accompanying disadvantages, such that the synthesis of the monomer becomes complicated, the monomer cannot be secured in a stable manner, and the degree of polymerization does not rise sufficiently on account of the steric hindrance of the side chain.

Thus there has been found no polyphenylene that could fulfill the requirements of heat resistance, low dielectric properties and processability and that could be produced economically.

DISCLOSURE OF THE INVENTION

An object of the present invention is to overcome the above-mentioned problems and to provide a soluble resin excellent in heat resistance, low dielectric properties, processability and transparency.

The present invention provides a process for producing a phenylene-containing polymer comprising polymerizing a monomer comprising not less than 50 mol % of a compound represented by formula (I):

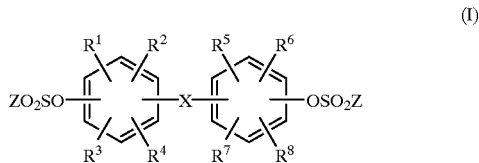

wherein X represents a group of formula: —CYY'—, wherein Y and Y', which may be the same or different, each represent a halogenated alkyl group, a hydrogen atom or an aryl group, or a fluorenylene group; $R^1$, $R^2$, $R^3$, $R^4$, $R^5$, $R^6$, $R^7$, and $R^8$, which may be the same or different, each represent a hydrogen atom, a halogen atom, an alkyl group, a halogenated alkyl group, an allyl group or an aryl group; and Z represents an alkyl group, a halogenated alkyl group or an aryl group, in the presence of a catalyst system containing a transition metal compound.

BEST MODE FOR PRACTICING INVENTION

Figure 1:
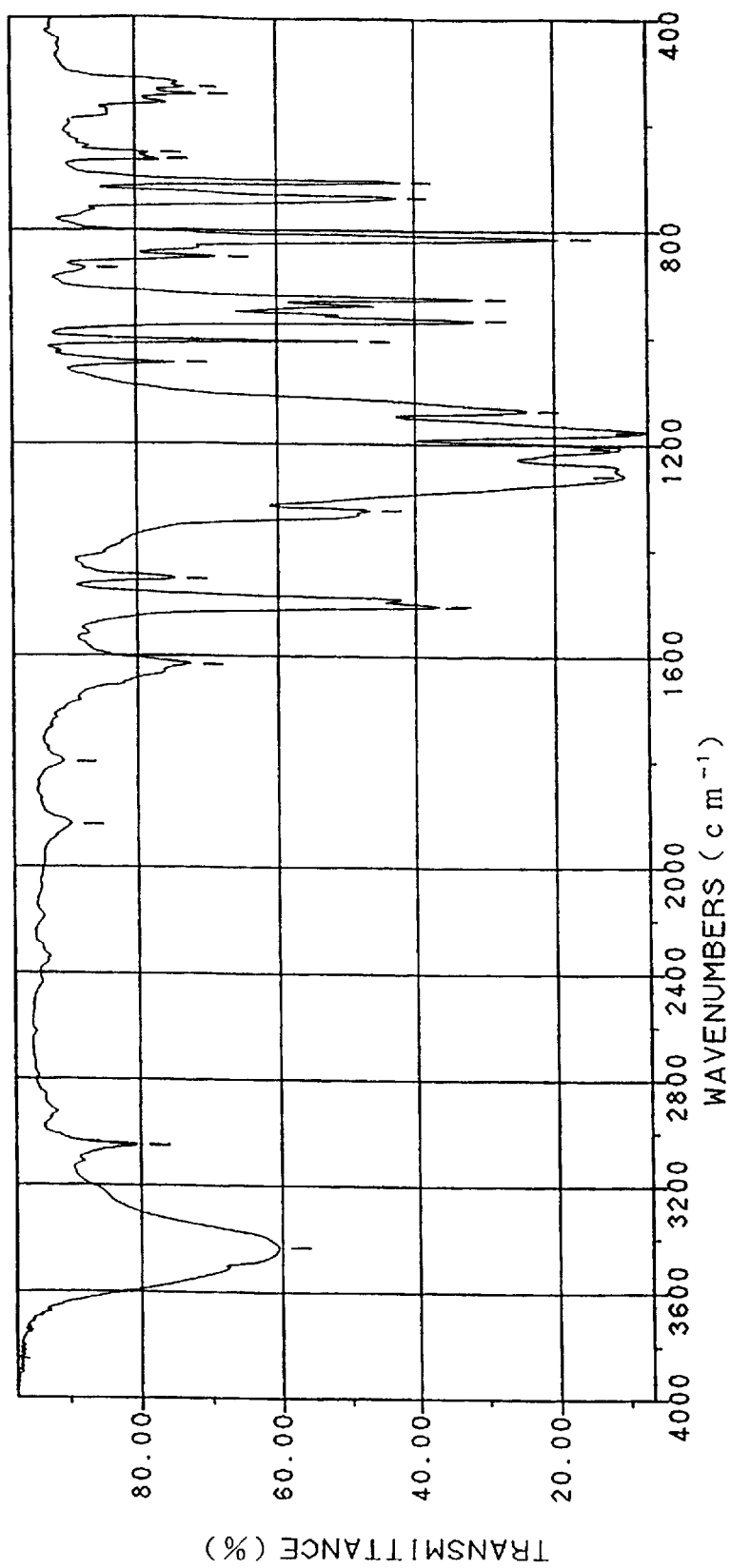
FIGS. 1 to 20 each show the IR spectrum of the polymers obtained in Examples 1 to 20.

Of the groups represented by Y or Y' in formula (I), the halogenated alkyl group includes a trifluoromethyl group and a pentafluoroethyl group; and the aryl group includes a phenyl group, a tolyl group, and a pentafluorophenyl group.

Of the groups and atoms represented by $R^1$, $R^2$, $R^3$, $R^4$, $R^5$, $R^6$, $R^7$, and $R^8$ in formula (I), the halogen atom includes a fluorine atom; the alkyl group include a methyl group and an ethyl group; the halogenated alkyl group includes a trifluoromethyl group and a pentafluoroethyl group; the allyl group includes a propenyl group; and the aryl group includes a phenyl group.

Of the groups represented by Z in —OSO₂Z in formula (I), the alkyl group includes a methyl group and an ethyl group; the halogenated alkyl group includes a trifluoromethyl group; and the aryl group includes a phenyl group, a p-fluorophenyl group, and a p-tolyl group.

X in formula (I) is preferably a group of formula:

—C(CF₃)₂—, a group of formula:

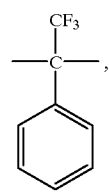

or a fluorenylene group of formula:

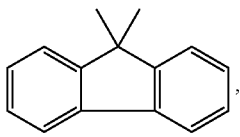

with the fluorenylene group being preferred.

Examples of the phenylene-containing compounds represented by formula (I) are 2,2-bis(4-methylsulfonyloxyphenyl)hexafluoropropane, bis(4-methylsulfonyloxyphenyl)methane, bis(4-methylsulfonyloxyphenyl)diphenylmethane, 2,2-bis(4-methylsulfonyloxy-3-methylphenyl)hexafluoropropoane, 2,2-bis(4-methylsulfonyloxy-3-propenylphenyl)hexafluoropropane, 2,2-bis(4-methylsulfonyloxy-3,5-dimethylphenyl)hexafluoropropane, 9,9-bis(4-methylsulfonyloxyphenyl)fluorene, 9,9-bis(4-methylsulfonyloxy-3-methylphenyl)fluorene, 9,9-bis(4-methylsulfonyloxy-3,5-dimethylphenyl)fluorene, 9,9-bis(4-methylsulfonyloxy-3-propenylphenyl)fluorene, 9,9-bis(4-methylsulfonyloxy-3-phenylphenyl)fluorene, bis(4-methylsulfonyloxy-3-methylphenyl)diphenylmethane, bis(4-methylsulfonyloxy-3,5-dimethylphenyl)diphenylmethane, bis(4-methylsulfonyloxy-3-propenylphenyl)diphenylmethane, bis(4-methylsulfonyloxy-3-fluorophenyl)diphenylmethane, bis(4-methylsulfonyloxy-3,5-difluorophenyl)diphenylmethane, 9,9-bis(4-methylsulfonyloxy-3-fluorophenyl)fluorene, 9,9-bis(4-methylsulfonyloxy-3,5-difluorophenyl)fluorene, bis(4-methylsulfonyloxyphenyl)methane, bis(4-methylsulfonyloxy-3-methylphenyl)methane, bis(4-methylsulfonyloxy-3,5-dimethylphenyl)methane, bis(4-methylsulfonyloxy-3-propenylphenyl)methane, bis(4-methylsulfonyloxyphenyl)trifluoromethylphenylmethane, bis(4-methylsulfonyloxyphenyl)phenylmethane, 2,2-bis(4-trifluoromethylsulfonyloxyphenyl)hexafluoropropane, bis(4-trifluoromethylsulfonyloxyphenyl)methane, bis(4-trifluoromethylsulfonyloxyphenyl)diphenylmethane, 2,2-bis(4-trifluoromethylsulfonyloxy-3-methylphenyl)hexafluoropropane, 2,2-bis(4-trifluoromethylsulfonyloxy-3-propenylphenyl)hexaflfuoropropane, 2,2-bis(4-trifluoromethylsulfonyloxy-3,5-dimethylphenyl)hexafluoropropane, 9,9-bis(4-trifluoromethylsulfonyloxyphenyl)fluorene, 9,9-bis(4-trifluoromethylsulfonyloxy-3-methylphenyl)fluorene, 9,9-bis(4-trifluoromethylsulfonyloxy-3,5-dimethylphenyl)fluorene, 9,9-bis(4-trifluoromethylsulfonyloxy-3-propenylphenyl)fluorene, 9,9-bis(4-trifluoromethylsulfonyloxy-3-phenylphenyl)fluorene, bis(4-trifluoromethylsulfonyloxy-3-methylphenyl)diphenylmethane, bis(4-trifluoromethylsulfonyloxy-3,5-dimethylphenyl)diphenylmethane, bis(4-trifluoromethylsulfonyloxy-3-propenylphenyl)diphenylmethane, bis(4-trifluoromethylsulfonyloxy-3-fluorophenyl)diphenylmethane, bis(4-trifluoromethylsulfonyloxy-3,5-difluorophenyl)diphenylmethane, 9,9-bis(4-trifluoromethylsulfonyloxy-3-fluorophenyl)fluorene, 9,9-bis(4-trifluoromethylsulfonyloxy-3,5-difluorophenyl)fluorene, bis(4-trifluoromethylsulfonyloxyphenyl)methane, bis(4-trifluoromethylsulfonyloxy-3-methylphenyl)methane, bis(4-trifluoromethylsulfonyloxy-3,5-dimethylphenyl)methane, bis(4-trifluoromethylsulfonyloxy-3-propenylphenyl)methane, bis(4-trifluoromethylsulfonyloxyphenyl)trifluoromethyl-phenylmethane, bis(4-trifluoromethylsulfonyloxyphenyl), 2,2-bis(4-phenylsulfonyloxyphenyl)hexafluoropropane, bis(4-phenylsulfonyloxyphenyl)methane, bis(4-phenylsulfonyloxyphenyl)diphenylmethane, 2,2-bis(4-phenylsulfonyloxy-3-methylphenyl)hexafluoropropane, 2,2-bis(4-phenylsulfonyloxy-3-propenylphenyl)hexafluoropropane, 2,2-bis(4-phenylsulfonyloxy-3,5-dimethylphenyl)hexafluoropropane, 9,9-bis(4-phenylsulfonyloxyphenyl)fluorene, 9,9-bis(4-phenylsulfonyloxy-3-methylphenyl)fluorene, 9,9-bis(4-phenylsulfonyloxy-3,5-dimethylphenyl)fluorene, 9,9-bis(4-phenylsulfonyloxy-3-propenylphenyl)fluorene, 9,9-bis(4-phenylsulfonyloxy-3-phenylphenyl)fluorene, bis(4-phenylsulfonyloxy-3-methylphenyl)diphenylmethane, bis(4-phenylsulfonyloxy-3,5-dimethylphenyl)diphenylmethane, bis(4-phenylsulfonyloxy-3-propenylphenyl)diphenylmethane, bis(4-phenylsulfonyloxy-3-fluorophenyl)diphenylmethane, bis(4-phenylsulfonyloxy-3,5-difluorophenyl)diphenylmethane, 9,9-bis(4-phenylsulfonyloxy-3-fluorophenyl)fluorene, 9,9-bis(4-phenylsulfonyloxy-3,5-difluorophenyl)fluorene, bis(4-phenylsulfonyloxyphenyl)methane, bis(4-phenylsulfonyloxy-3-methylphenyl)methane, bis(4-phenylsulfonyloxy-3,5-dimethylphenyl)methane, bis(4-phenylsulfonyloxy-3-propenylphenyl)methane, bis(4-phenylsulfonyloxyphenyl)trifluoromethylphenylmethane, bis(4-phenylsulfonyloxyphenyl)phenylmethane, 2,2-bis(-p-tolylsulfonyloxyphenyl)hexafluoropropoane, bis(p-tolylsulfonyloxyphenyl)methane, bis(p-tolylsulfonyloxyphenyl)diphenylmethane, 2,2-bis(p-tolylsulfonyloxy-3-methylphenyl)hexafluoropropane, 2,2-bis(p-tolylsulfonyloxy-3-propenylphenyl)hexafluoropropane, 2,2-bis(p-tolylsulfonyloxy-3,5-dimethylphenyl)hexafluoropropane, 9,9-bis(p-tolylsulfonyloxyphenyl)fluorene, 9,9-bis(p-tolylsulfonyloxy-3-methylphenyl)fluorene, 9,9-bis(p-tolylsulfonyloxy-3,5-dimethylphenyl)fluorene, 9,9-bis(p-tolylsulfonyloxy-3-propenylphenyl)fluorene, 9,9-bis(p-tolylsulfonyloxy-3-phenylphenyl)fluorene, bis(p-tolylsulfonyloxy-3-methylphenyl)diphenylmethane, bis(p-tolylsulfonyloxy-3,5-dimethylphenyl)diphenylmethane, bis(p-tolylsulfonyloxy-3-propenylphenyl)diphenylmethane, bis(p-tolylsulfonyloxy-3-fluorophenyl)diphenylmethane, bis(p-tolylsulfonyloxy-3,5-difluorophenyl)diphenylmethane, 9,9-bis(p-tolylsulfonyloxy-3-fluorophenyl)fluorene, 9,9-bis(p-tolylsufonyloxy-3,5-difluorophenyl)fluorene, bis(p-tolylsulfonyloxyphenyl)methane, bis(p-tolylsulfonyloxy-3-methylphenyl)methane, bis(p-tolylsulfonyloxy-3,5-dimethylphenyl)methane, bis(p-tolylsulfonyloxy-3-propenylphenyl)methane, bis(p-tolylsulfonyloxyphenyl)trifluoromethylphenylmethane, and bis(p-tolylsulfonyloxyphenyl)phenylmethane.

In the present invention, two or more compounds represented by formula (I) can be copolymerized.

The compound of formula (I) is synthesized by, for example, the following process.

A bisphenol compound (e.g., 2,2-bis(4-hydroxyphenyl)hexafluoropropane) and two or more equivalents of a base are dissolved in a solvent. Pyridine can serve as both a base and a solvent. If desired, a catalyst such as 4-dimethylaminopyridine can be added.

A sulfonic acid chloride (or anhydride) (e.g., methanesulfonic acid chloride) is added dropwise to the solution over a period of 5 to 60 minutes in a dry nitrogen stream while maintaining the solution below 15° C., followed by stirring at the same temperature for 0 to 60 minutes. The stirring is continued at room temperature for 0 to 24 hours to prepare a suspension. The resulting suspension is re-precipitated in 3 to 20 times as much ice-water as the suspension. The precipitate is collected and further purified by, for example, recrystallization to give bissulfonate compound crystals.

Alternatively a bisphenol compound (e.g., 2,2-bis(4-hydroxyphenyl)hexafluoropropane) is dissolved in 2 equivalents of an alkali aqueous solution, such as a sodium hydroxide aqueous solution. Separately, a sulfonic acid chloride (or anhydride) (e.g., methanesulfonic acid chloride) is dissolved in an organic solvent, such as toluene or chloroform. The two solutions are mixed and vigorously stirred in the presence of, if desired, a phase transfer catalyst, such as acetyltrimethylammonium chloride. The organic layer of the resulting reaction mixture is purified to yield a desired bissulfonate compound.

The compound of formula (I) can be copolymerized with at least one compound selected from compounds represented by formulae (II) to (VI) shown below.

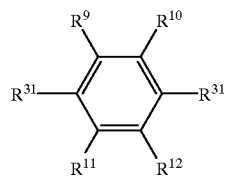

(II)

wherein $R^9$, $R^{10}$, $R^{11}$, and $R^{12}$, which may be the same or different, each represent a hydrogen atom, a halogen atom, a hydroxy group or a monovalent organic group; and $R^{31}$ represents a halogen atom or a group of formula: $-OSO_2Z$, wherein Z represents an alkyl group, a halogenated alkyl group or an aryl group.

Of the groups represented by $R^{31}$ in formula (II), the halogen atom includes a chlorine atom, a bromine atom and an iodine atom.

Of the groups represented by Z in $-OSO_2Z$ in formula (II), the alkyl group includes a methyl group and an ethyl group; the halogenated alkyl group includes a trifluoromethyl group; and the aryl group includes a phenyl group, a p-fluorophenyl group, and a p-tolyl group.

Of the atoms or groups as $R^9$, $R^{10}$, $R^{11}$, and $R^{12}$ in formula (II), the halogen atom includes a fluorine atom, and the monovalent organic group includes an alkyl group, a halogenated alkyl group, an alkoxy group, an acetoxy group, a phenoxy group, and a benzoyl group. The organic group is effective in improving the solubility of the resulting polymer. It is preferred that $R^9$, $R^{10}$, $R^{11}$, and $R^{12}$ be a monovalent reactive group or a precursor thereof, particularly be selected from the group consisting of a hydroxyl group, a carboxyl group, an allyl group, and an alkoxycarbonyloxy group. The reactive group precursor can be converted to a corresponding reactive group through an appropriate treatment following polymerization. Introduction of the reactive group into the polymer brings about improvements in solvent resistance and adhesion of the polymer.

Where adjacent two of $R^9$, $R^{10}$, $R^{11}$, and $R^{12}$ are each a carboxyl group, the two carboxyl groups can react to form an acid anhydride.

Examples of the compounds represented by formula (II) include p-dichlorobenzene, p-dibromobenzene, p-diiodobenzene, p-dimethylsulfonyloxybenzene, 2,5-dichlorotoluene, 2,5-dibromotoluene, 2,5-diiodotoluene, 2,5-dimethylsulfonyloxybenzene, 2,5-dichloro-p-xylene, 2,5-dibromo-p-xylene, 2,5-diiodo-p-xylene, 2,5-dichlorobenzotrifluoride, 2,5-dibromobenzotrifluoride, 2,5-diiodobenzotrifluoride, 1,4-dichloro-2,3,5,6-tetrafluorobenzene, 1,4-dibromo-2,3,5,6-tetrafluorobenzene, 1,4-diiodo-2,3,5,6-tetrafluorobenzene, 2,5-dichlorobenzoic acid, 2,5-dibromobenzoic acid, methyl 2,5-dichlorobenzoate, methyl 2,5-dibromobenzoate, t-butyl 2,5-dichlorobenzoate, t-butyl 2,5-dibromobenzoate, and 3,6-dichlorophthalic acid anhydride. p-Dichlorobenzene, p-dimethylsulfonyloxybenzene, 2,5-dichlorotoluene, and 2,5-dichlorobenzotrifluoride are preferred.

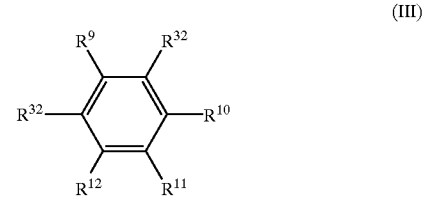

(III)

wherein $R^9$, $R^{10}$, $R^{11}$, and $R^{12}$, which may be the same or different, each represent a hydrogen atom, a halogen atom, a hydroxy group or a monovalent organic group; and $R^{32}$ represents a halogen atom or a group of formula: $-OSO_2Z$, wherein Z represents an alkyl group, a halogenated alkyl group or an aryl group.

Examples of the halogen atom and the monovalent organic group as $R^9$, $R^{10}$, $R^{11}$, and $R^{12}$ and the alkyl, halogenated alkyl or aryl group in $R^{32}$ in formula (III) are the same as those enumerated as for formula (II).

To have at least one monovalent reactive group or reactive group precursor as $R^9$, $R^{10}$, $R^{11}$, and $R^{12}$ is preferred for improving the adhesion of the polymer.

Examples of the compounds represented by formula (III) are m-dichlorobenzene, m-dibromobenzene, m-diiodobenzene, m-dimethylsulfonyloxybenzene, 2,4-dichlorotoluene, 2,4-dibromotoluene, 2,4-diiodotoluene, 3,5-dichlorotoluene, 3,5-dibromotoluene, 3,5-diiodotoluene, 2,6-dichlorotoluene, 2,6-dibromotoluene, 2,6-diiodotoluene, 3,5-dimethylsulfonyloxytoluene, 2,6-dimethylsulfonyloxytoluene, 2,4-dichlorobenzotrifluoride, 2,4-dibromobenzotrifluoride, 2,4-diiodobenzotrifluoride, 3,5-dichlorobenzotrifluoride, 3,5-dibromotrifluoride, 3,5-diiodobenzotrifluoride, 1,3-dibromo-2,4,5,6-tetrafluorobenzene, 2,4-dichlorobenzyl alcohol, 3,5-dichlorobenzyl alcohol, 2,4-dibromobenzyl alcohol, 3,5-dibromobenzyl alcohol, 3,5-dichlorophenol, 3,5-dibromophenol, 3,5-dichloro-t-butoxycarbonyloxyphenyl, 3,5-dibromo-t-butoxycarbonyloxyphenyl, 2,4-dichlorobenzoic acid, 3,5-dichlorobenzoic acid, 2,4-dibromobenzoic acid, 3,5-dibromobenzoic acid, methyl 2,4-dichlorobenzoate, methyl 3,5-dichlorobenzoate, methyl 3,5-dibromobenzoate, methyl 2,4-dibromobenzoate, t-butyl 2,4-dichlorobenzoate, t-butyl 3,5-dichlorobenzoate, t-butyl 2,4-dibromobenzoate, and t-butyl 3,5-dibromobenzoate. Preferred of them are m-dichlorobenzene, 2,4-dichlorotoluene, 3,5-dimethylsulfonyloxytoluene, and 2,4-dichlorobenzotrifluoride.

Apart from the compounds represented by formula (II) or (III), o-dichlorobenzene, o-dibromobenzene, o-diiodobenzene, o-dimethylsulfonyloxybenzene, 2,3-dichlorotoluene, 2,3-dibromotoluene, 2,3-diiodotoluene, 3,4-dichlorotoluene, 3,4-dibromotoluene, 3,4-diiodotoluene, 2,3-dimethylsulfonyloxybenzene, 3,4-dimethylsulfonyloxybenzene, 3,4-dichlorobenzotrifluoride, 3,4-dibromobenzotrifluoride, 3,4-diiodobenzotrifluoride, 1,2-dibromo-3,4,5,6-tetrafluorobenzene, 4,5- dichlorophthalic acid anhydride, etc. can also be used as a copolymerizable monomer.

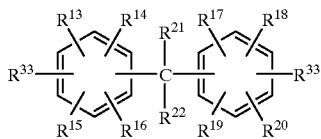
(IV)

wherein $R^{21}$ and $R^{22}$, which may be the same or different, each represent an alkyl group or an aryl group, provided that at least one of $R^{21}$ and $R^{22}$ is an alkyl group; $R^{13}$, $R^{14}$, $R^{15}$, $R^{16}$, $R^{17}$, $R^{18}$, $R^{19}$, and $R^{20}$, which may be the same or different, each represent a hydrogen atom, a halogen atom or a monovalent organic group; and $R^{33}$ represents a halogen atom or a group of formula: $-OSO_2Z$, wherein Z represents an alkyl group, a halogenated alkyl group or an aryl group.

In formula (IV), the alkyl group as $R^{21}$ or $R^{22}$ includes a methyl group, an ethyl group, and a propyl group and the aryl group as $R^{21}$ or $R^{22}$ includes a phenyl group, a p-fluorophenyl group, and a p-tolyl group.

As for $R^{13}$, $R^{14}$, $R^{15}$, $R^{16}$, $R^{17}$, $R^{18}$, $R^{19}$, and $R^{20}$, the halogen atom includes a fluorine atom; the monovalent organic group includes an alkyl group, e.g., methyl, ethyl or propyl, a halogenated alkyl group, e.g., trifluoromethyl or pentafluoroethyl, an aryl group, e.g., phenyl, and an alkenyl group, e.g., propylenyl. As for Z, the alkyl group includes a methyl group, an ethyl group, and a propyl group; the halogenated alkyl group includes a trifluoromethyl group and a pentafluoroethyl group; and the aryl group includes a phenyl group, a p-fluorophenyl group, and a p-tolyl group.

Examples of the compounds represented by formula (IV) are 2,2-bis(4-methylsulfonyloxyphenyl)propane, 2,2-bis(4-methylsulfonyloxy-3-methylphenyl)propane, 2,2-bis(4-methylsulfonyloxy-3-propenylphenyl)propane, 2,2-bis(4-methylsulfonyloxy-3,5-dimethylphenyl)propane, 2,2-bis(4-methylsulfonyloxy-3-fluorophenyl)propane, 2,2-bis(4-methylsulfonyloxy-3,5-difluorophenyl)propane, 2,2-bis(4-trifluoromethylsulfonyloxyphenyl)propane, 2,2-bis(4-trifluoromethylsulfonyloxy-3-propenylphenyl)propane, 2,2-bis(4-phenylsulfonyloxyphenyl)propane, 2,2-bis(4-phenylsulfonyloxy-3-methylphenyl)propane, 2,2-bis(4-phenylsulfonyloxy-3-propenylphenyl)propane, 2,2-bis(4-phenylsulfonyloxy-3,5-dimethylphenyl)propane, 2,2-bis(4-phenylsulfonyloxy-3-fluorophenyl)diphenylmethane, 2,2-bis(p-tolylsulfonyloxyphenyl)propane, 2,2-bis(p-tolylsulfonyloxy-3-methylphenyl)propane, 2,2-bis(p-tolylsulfonyloxy-3-propenylphenyl)propane, 2,2-bis(p-tolylsulfonyloxy-3,5-dimethylphenyl)propane, 2,2-bis(p-tolylsulfonyloxy-3-methylphenyl)propane, 2,2-bis(p-tolylsulfonyloxy-3,5-dimethylphenyl)propane, 2,2-bis(p-tolylsulfonyloxy-3-propenylphenyl)propane, bis(p-tolylsulfonyloxy-3-fluorophenyl)propane, bis(p-tolylsulfonyloxy-3,5-difluorophenyl)propane, and 1,1-bis(4-methylsulfonyloxyphenyl)-1-phenylethane.

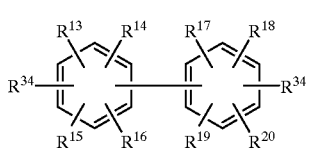
(V)

wherein $R^{13}$, $R^{14}$, $R^{15}$, $R^{16}$, $R^{17}$, $R^{18}$, $R^{19}$, and $R^{20}$, which may be the same or different, each represent a hydrogen atom, a halogen atom, an alkyl group, a halogenated alkyl group or an aryl group; and $R^{34}$ represents a halogen atom or a group of formula: $-OSO_2Z$, wherein Z represents an alkyl group, a halogenated alkyl group or an aryl group.

Examples of the compounds represented by formula (V) include 4,4'-dimethylsulfonyloxybiphenyl, 4,4'-dibromobiphenyl, 4,4'-diiodobiphenyl, 4,4'-dimethylsulfonyloxy-3,3'-dimethylbiphenyl, 4,4'-dimethylsulfonyloxy-3,3,-difluorobiphenyl, and 4,4'-dimethylsulfonyloxy-3,3',5,5'-tetrafluorobiphenyl.

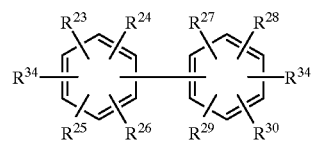
(VI)

wherein $R^{23}$, $R^{24}$, $R^{25}$, $R^{26}$, $R^{27}$, $R^{28}$, $R^{29}$, and $R^{30}$ each represent a hydrogen atom or an allyl group, provided that at least one of $R^{23}$ to $R^{30}$ is an allyl group; and $R^{34}$ represents a halogen atom or a group of formula: $-OSO_2Z$, wherein Z represents an alkyl group, a halogenated alkyl group or an aryl group.

Examples of the compounds represented by formula (VI) include 4,4'-dimethylsulfonyloxy-3,3'-dipropenylbiphenyl, and 3,3'-dipropenyl-4,4'-bis(4-fluorophenylsulfonyloxy)biphenyl.

In the compounds represented by formulae (V) and (VI), the group $R^{34}$ is preferably present at the p-position.

Where the compound of formula (I) is copolymerized with the compound of formula (II), the former is usually used in a proportion of 50 to 95 mol %, and the latter 5 to 50 mol %.

Where the compound of formula (I) is copolymerized with the compound of formula (III), the former is usually used in a proportion of 50 to 95 mol %, preferably 55 to 85 mol %, and the latter is usually used in a proportion of 5 to 50 mol %, preferably 15 to 45 mol %. If the proportion of the compound of formula (III) exceeds 50 mol %, disadvantages such that the resulting polymer has insufficient molecular weight tend to result. If it is less than 5 mol %, the resulting polymer tends to fail to have sufficient solvent resistance as intended.

In copolymerizing the compound of formula (I) with the compound of formula (IV), the former is usually used in a proportion of 50 to 95 mol %, and the latter 5 to 50 mol %. If the proportion of the compound of formula (IV) exceeds 50 mol %, disadvantages such that the resulting polymer has insufficient molecular weight tend to result. If it is less than 5 mol %, the resulting polymer tends to fail to have sufficient solubility as intended or sufficient solvent resistance as intended.

In copolymerizing the compound of formula (I) with the compound of formula (V), the former is usually used in a proportion of 75 to 95 mol %, preferably 80 to 95 mol %, and the latter is usually used in a proportion of 5 to 25 mol %, preferably 5 to 20 mol %. If the proportion of the compound of formula (V) exceeds 25 mol %, disadvantages such that the resulting polymer has insufficient solubility can result. If it is less than 5 mol %, the resulting polymer tends to fail to have sufficient solvent resistance as intended.

In copolymerizing the compound of formula (I) with the compound of formula (VI), the former is usually used in a proportion of 50 to 95 mol %, preferably 60 to 95 mol %, and the latter is usually used in a proportion of 5 to 50 mol %, preferably 5 to 40 mol %. If the proportion of the compound of formula (VI) exceeds 50 mol %, disadvantages such that the resulting polymer has insufficient molecular weight and solubility can result. If it is less than 5 mol %, the resulting polymer tends to fail to have sufficient solvent resistance as intended.

The catalyst system which can be used in the production of the phenylene-containing polymer of the present invention contains a transition metal compound. The catalyst system essentially comprises (1) a combination of a transition metal salt and a ligand or a transition metal (or salt) having a ligand coordinated thereto and (2) a reducing agent. The catalyst system may further contain a salt to increase the rate of polymerization.

The transition metal salt includes nickel compounds, such as nickel chloride, nickel bromide, nickel iodide, and nickel acetylacetonate; palladium compounds, such as palladium chloride, palladium bromide, and palladium iodide; iron compounds, such as iron chloride, iron bromide, and iron iodide; and cobalt compounds, such as cobalt chloride, cobalt bromide, and cobalt iodide. Preferred among them are nickel chloride and nickel bromide.

The ligand includes triphenylphosphine, 2,2'-bipyridine, 1,5-cyclooctadiene, and 1,3-bis(diphenylphosphino)propane, with triphenylphosphine and 2,2'-bipyridine being preferred. These ligands may be used either individually or as a combination of two or more thereof.

The transition metal (or salt) having a ligand coordinated thereto includes di(triphenylphosphine)nickel chloride, di(triphenylphosphine)nickel bromide, di(triphenylphosphine)nickel iodide, di(triphenylphosphine)nickel nitrate, 2,2'-bipyridinenickel chloride, 2,2'-bipyridinenickel bromide, 2,2'-bipyridinenickel iodide, 2,2'-bipyridinenickel nitrate, bis(1,5-cyclooctadiene)nickel, tetrakis(triphenylphosphine)nickel, tetrakis(triphenylphosphite)nickel, and tetrakis(triphenylphosphine)palladium, with di(triphenylphosphine)nickel chloride and 2,2'-bipyridinenickel chloride being preferred.

The reducing agent to be used in the catalyst system of the present invention includes iron, zinc, manganese, aluminum, magnesium, sodium and calcium, with zinc and manganese being preferred. These reducing agents can be activated on contact with an acid or an organic acid.

The salt which may be used in the catalyst system includes sodium compounds, such as sodium fluoride, sodium chloride, sodium bromide, sodium iodide, and sodium sulfate; potassium compounds, such as potassium fluoride, potassium chloride, potassium bromide, potassium iodide, and potassium sulfate; and ammonium compounds, such as tetraethylammonium fluoride, tetraethylammonium chloride, tetraethylammonium bromide, tetraethylammonium iodide, and tetraethylammonium sulfate. Sodium bromide, sodium iodide, potassium bromide, tetraethylammonium bromide and tetraethylammonium iodide are preferred of them.

The transition metal salt or transition metal (salt) having a ligand coordinated thereto is generally used in an amount of 0.0001 to 10 mol, preferably 0.01 to 5 mol, per mole of the compound of formula (I) or a monomer mixture of the compound of formula (I) and the compound represented by formulae (II) to (V) (hereinafter inclusively referred to as "the total monomer"). If the amount of the transition metal component is less than 0.0001 mol, the polymerization reaction does not proceed sufficiently. If it exceeds 10 mol, the molecular weight is reduced.

Where a combination of the transition metal salt and the ligand is used, the ligand is usually used in an amount of 0.1 to 100 mol, preferably 1 to 10 mol, per mole of the transition metal salt. If the amount of the ligand is less than 0.1 mol, the catalyst activity is insufficient. If it is more than 100 mol, the resulting polymer is difficult to purify.

The reducing agent is usually used in an amount of 0.1 to 100 mol, preferably 1 to 10 mol, per mole of the total monomer. If the amount of the reducing agent is less than 0.1 mol, the polymerization reaction does not proceed sufficiently. If it is more than 100 mol, the resulting polymer is difficult to purify.

In using a salt in combination with the above essential components, the salt is usually used in an amount of 0.001 to 100 mol, preferably 0.01 to 1 mol, per mole of the total monomer. If the amount is less than 0.001 mol, the effect in increasing the rate of polymerization is insufficient. If it exceeds 100 mol, the resulting polymer is difficult to purity.

Polymerization solvents which can be used in the present invention include tetrahydrofuran, cyclohexanone, dimethyl sulfoxide, N,N-dimethylformamide, N,N-dimethylacetamide, 1-methyl-2-pyrrolidone, γ-butyrolactone, and γ-butyrolactam. Tetrahydrofuran, N,N-dimethylformamide, N,N-dimethylacetamide, and 1-methyl-2-pyrrolidone are preferred. It is preferred for these solvents to be dried thoroughly before use.

The total monomer concentration in the polymerization system is usually from 1 to 100% by weight, preferably 5 to 40% by weight.

The polymerization is usually carried out at a temperature of 0 to 200° C., preferably 50 to 90° C., for a period of 0.5 to 100 hours, preferably 1 to 40 hours.

The phenylene-containing polymer obtained by the process of the present invention comprises not less than 50 mol % of a repeating unit represented by formula (VII):

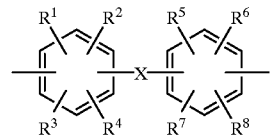

(VII)

wherein X represents a group of formula: —CYY'—, wherein Y and Y', which may be the same or different, each represent a hydrogen atom, a halogenated alkyl group or an aryl group, or a fluorenylene group; and $R^1$, $R^2$, $R^3$, $R^4$, $R^5$, $R^6$, $R^7$, and $R^8$, which may be the same or different, each represent a hydrogen atom, a halogen atom, an alkyl group, a halogenated alkyl group, an allyl group or an aryl group, and having a weight-average molecular weight of 1,000 to 1,000,000 on polystyrene conversion.

The phenylene-containing polymer of the present invention can consist solely of the repeating unit represented by formula (VII) (the unit content=100 mol %) or contain not more than 50 mol % of other repeating unit(s) as described hereunder.

Copolymerization of the compound of formula (I) and the compound of formulae (II) to (V) gives copolymers represented by formulae (VIII) to (X):

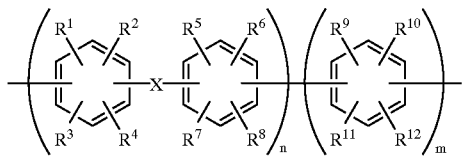

(VIII)

wherein X represents a group of formula: —CYY'—, wherein Y and Y', which may be the same or different, each represent a halogenated alkyl group, a hydrogen atom or an aryl group, or a fluorenylene group; and $R^1$, $R^2$, $R^3$, $R^4$, $R^5$, $R^6$, $R^7$, and $R^8$, which may be the same or different, each represent a hydrogen atom, a halogen atom, an alkyl group, a halogenated alkyl group, an allyl group or an aryl group; $R^9$, $R^{10}$, $R^{11}$, and $R^{12}$, which may be the same or different, each represent a hydrogen atom, a halogen atom, a hydroxy group or a monovalent organic group; and n and m each represent a mole fraction of 50 to 95 mol % and 5 to 50 mol %, respectively, making a total of 100 mol %.

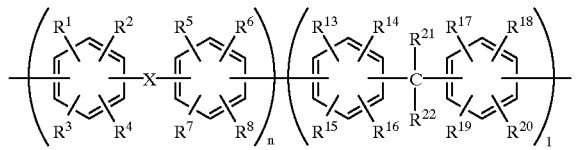

(IX)

wherein X represents a group of formula: —CYY'—, wherein Y and Y', which may be the same or different, each represent a halogenated alkyl group, a hydrogen atom or an aryl group, or a fluorenylene group; and $R^1$, $R^2$, $R^3$, $R^4$, $R^5$, $R^6$, $R^7$, and $R^8$, which may be the same or different, each represent a hydrogen atom, a halogen atom, an alkyl group, a halogenated alkyl group, an allyl group or an aryl group; $R^{21}$ and $R^{22}$, which may be the same or different, each represent an alkyl group or an aryl group, provided that at least one of $R^{21}$ and $R^{22}$ is an alkyl group; $R^{13}$, $R^{14}$, $R^{15}$, $R^{16}$, $R^{17}$, $R^{18}$, $R^{19}$, and $R^{20}$, which may be the same or different, each represent a hydrogen atom, a halogen atom or a monovalent organic group; and n and l each represent a mole fraction of 50 to 95 mol % and 5 to 50 mol %, respectively, making a total of 100 mol %.

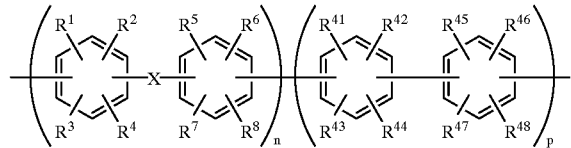

(X)

wherein X represents a group of formula: —CYY'—, wherein Y and Y', which may be the same or different, each represent a halogenated alkyl group, a hydrogen atom or an aryl group, or a fluorenylene group; and $R^1$, $R^2$, $R^3$, $R^4$, $R^5$, $R^6$, $R^7$, and $R^8$, which may be the same or different, each represent a hydrogen atom, a halogen atom, an alkyl group, a halogenated alkyl group, an allyl group or an aryl group; $R^{41}$, $R^{42}$, $R^{43}$, $R^{44}$, $R^{45}$, $R^{46}$, $R^{47}$, and $R^{48}$, which may be the same or different, each represent a hydrogen atom, a halogen atom or a monovalent organic group; and n and p each represent a mole fraction of 50 to 95 mol % and 5 to 50 mol %, respectively, making a total of 100 mol %.

In formulae (VII) to (X), it is preferred that X be

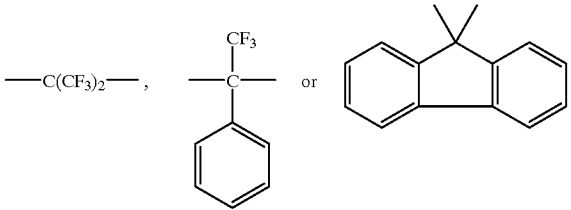

(fluorenylene group).

The phenylene-containing (co)polymer according to the present invention provides a film-forming material. The film-forming material of the present invention can be obtained by a method comprising melting the phenylene-containing (co)polymer in a powder form and pressing or injection molding the molten polymer into film or a method comprising dissolving the phenylene-containing (co) polymer in a solvent, casting the polymer solution on a substrate or applying the solution to a substrate by spin coating, followed by baking to remove the solvent.

The powdered phenylene-containing (co)polymer can be melted by heating the polymer to a temperature higher than the softening point usually by 10 to 250° C., preferably by 40 to 150° C.

Suitable solvents for dissolving the phenylene-containing (co)polymer include tetrahydrofuran, cyclohexanone, dimethyl sulfoxide, N,N-dimethylformamide, N,N-dimethylacetamide, 1-methyl-2-pyrrolidone, γ-butyrolactone, ethylene glycol monomethyl ether, ethylene glycol dimethyl ether, ethylene glycol methyl ethyl ether, ethylene glycol monoethyl ether, methyl cellosolve acetate, ethyl cellosolve acetate, diethylene glycol monomethyl ether, diethylene glycol diethyl ether, diethylene glycol dimethyl ether, diethylene glycol ethyl methyl ether, diethylene glycol monoethyl ether, diethylene glycol monobutyl ether, propylene glycol methyl ether acetate, propylene glycol ethyl ether acetate, toluene, xylene, methyl ethyl ketone, methyl amyl ketone, 4-hydroxyl-4-methyl-2-pentanone, ethyl 2-hydroxypropionate, methyl 2-hydroxy-2-methylpropionate, ethyl 2-hydroxy-2-methylpropionate, ethyl ethoxyacetate, ethyl hydroxyacetate, methyl 2-hydroxy-2-methylbutanoate, methyl 3-methoxypropionate, ethyl 3-methoxypropionate, methyl 3-ethoxypropionate, ethyl 3-ethoxypropionate, ethyl acetate, butyl acetate, methyl lactate, ethyl lactate, chloroform, and methylene chloride. Preferred of them are cyclohexanone, N,N-dimethylacetamide, 1-methyl-2-pyrrolidone, γ-butyrolactone, ethyl 3-ethoxypropionate, ethyl lactate, propylene glycol monomethyl ether acetate, ethylene glycol monoethyl ether acetate, and methyl amyl ketone.

The phenylene-containing (co)polymer is dissolved in the solvent in a concentration of 1 to 60% by weight, preferably 5 to 40% by weight. If the concentration is lower than 1% by weight, a film of sufficient thickness is hardly obtainable. If it is higher than 60% by weight, the solution hardly spreads, failing to provide a uniform film.

If desired, additives can be incorporated into the phenylene-containing polymer having the repeating unit of formula (VII) or represented by formulae (VIII) to (X). Suitable additives include silane coupling agents, methylol melamine, and bonding aids and crosslinking agents such as triazene compounds.

The phenylene-containing polymers produced by the process of the present invention are useful as an interlayer dielectric film, a protective film, a low-reflective coating, an optical waveguide material, an anti reflection coating, a sealant, an alignment layer for liquid crystal display, a printed circuit board material, a gas-permeable film, and the like. They are particularly suited as an interlayer dielectric film and an optical material.

EXAMPLES

The present invention will now be illustrated in greater detail with reference to Examples, but it should be understood that the present invention is not limited thereto. Unless otherwise noted, all the percents and parts are by weight. In Examples measurements and evaluation were made as follows.

1) Weight-Average Molecular Weight (Mw)

Measured by gel-permeation chromatography (GPC) on polystyrene conversion.

2) Temperature at 5% loss ($Td_5$)

Measured by thermogravimetry at a rate of temperature rise of 10° C./min in a nitrogen atmosphere.

3) Glass Transition Temperature (Tg)

Measured by differential scanning calorimetry at a rate of temperature rise of 20° C./min.

4) Film-forming Properties

A polymer was dissolved in cyclohexanone (or 1-methyl-2-pyrrolidone in Example 19) at a concentration of 20%. The solution was applied to a glass substrate by spin coating and baked at 80° C. for 2 minutes, at 120° C. for 2 minutes, and finally at 160° C. for 30 minutes (or 230° C. for 30 minutes in Example 19). The appearance of the resulting coat was observed with the naked eye.

5) Dielectric Constant

A coating film of a polymer was formed on a SUS substrate in the same manner as described in (4) above. A gold electrode was formed thereon by vacuum deposition through a mask to prepare a specimen for measurement of relative dielectric constant. The electrostatic capacity was measured with an LCR meter, from which the dielectric constant $\in$ was obtained through equation:

$$\in = C \cdot d / \in_0 \cdot S$$

wherein $\in$ is a dielectric constant; C is an electrostatic capacity; $\in_0$ is a unit dielectric constant in vacuo; and S is the area of the upper electrode at 1 MHz.

6) Volume Resistivity

Measured in accordance with JIS K6911, except for using a specimen prepared by applying a polymer to a SUS substrate.

7) Organic Solvent Solubility

A powdered polymer was added to a test solvent in a concentration of 20%, and the dissolution behavior at 23° C. was observed with the naked eye.

Test solvent

NMP: 1-Methyl-2-pyrrolidone

CHN: Cyclohexanone

PGMEA: Propylene glycol 1-monomethyl ether 2-acetate

Standard of Evaluation

A . . . Completely dissolved

B . . . Partly dissolved

C . . . Not dissolved

8) Solvent Resistance

A coating film prepared in Test Example hereinafter given was immersed in a test solvent at 23° C. for 10 minutes, and any change in appearance was observed with the naked eye.

Test Solvent

NMP: 1-methyl-2-pyrrolidone

DMSO: Dimethyl sulfoxide

PGMEA: Propylene glycol 1-monomethyl ether 2-acetate

Standard of Evaluation

A . . . No change

B . . . Peeling and swelling

C . . . Dissolution

Example 1

In a 500 ml-volume three-necked flask equipped with a tube for introducing argon gas and a thermometer were charged 7.5 g of sodium iodide, 1.3 g of anhydrous nickel chloride, 15.7 g of triphenylphosphine, 45.8 g of zinc powder activated with acetic acid, and 49.2 g of 2,2-bis(4-methylsulfonyloxyphenyl)hexafluoropropane. The mixture was dried in vacuo for 24 hours, and the flask was filled with argon gas. In the flask was put 150 ml of dry N,N-dimethylacetamide, and the mixture was stirred at 70° C. in an argon stream, whereupon the reaction mixture turned brown. The reaction was continued at 70° C. for 20 hours. The reaction mixture was poured into a mixture of 500 ml of 36% hydrochloric acid and 2000 ml of methanol, and the precipitate formed was collected.

The precipitate was suspended in chloroform and extracted with a 2N hydrochloric acid aqueous solution. The chloroform layer was poured into methanol, and the precipitate was collected and dried to obtain a white powdered polymer. The results of analysis and evaluation on the resulting polymer are shown in Table 2 below.

Examples 2 to 11

Polymers were produced in the same manner as in Example 1, except for replacing the 2,2-bis(4-methylsulfonyloxyphenyl)hexafluoropropane (49.2 g) with the monomer or monomers shown in Table 1 below. The results of analysis and evaluation on the resulting polymers are shown in Table 2.

Examples 12 and 13

Polymers were produced in the same manner as in Example 1, except for replacing the 2,2-bis(4-methylsulfonyloxyphenyl)hexafluoropropane (49.2 g) with the monomers shown in Table 1 below.

Ten grams of the resulting copolymer were put in a 300 ml-volume egg-plant flask equipped with a reflux condenser and a stirrer, and 0.5 g of p-toluenesulfonic acid monohydrate and 220 g of toluene were added thereto, followed by stirring at 120° C. for 3 hours. The reaction mixture was concentrated to about 50 ml. The concentrate was poured into methanol to re-precipitate to give a white powdered polymer having a hydroxyl group. The results of analysis and evaluation on the resulting copolymer are shown in Table 2.

Example 14

A polymer was produced in the same manner as in Example 1, except for replacing the 2,2-bis(4-methylsulfonyloxyphenyl)hexafluoropropane (49.2 g) with the monomers shown in Table 1 below.

In an egg-plant flask equipped with a stirrer were charged 10.9 g of potassium t-butoxide and 100 ml of dimethyl sulfoxide to prepare a uniform solution. To the solution was added 10 g of the resulting polymer, followed by stirring at 80° C. for 4 hours. The reaction mixture was poured into a mixture of 250 ml of 0.5N hydrochloric acid and 500 ml of methanol. The precipitate thus formed was collected, dissolved in 100 ml of chloroform, washed twice with 2N hydrochloric acid and then once with pure water, and re-precipitated in methanol to obtain a white powdered polymer having a carboxyl group. The results of analysis and evaluation on the resulting polymer are shown in Table 2.

Example 15

In a 500 ml-volume three-necked flask equipped with a tube for introducing argon gas and a thermometer were charged 7.5 g of sodium iodide, 1.3 g of anhydrous nickel chloride, 15.7 g of triphenylphosphine, 45.8 g of zinc powder activated with acetic acid, and 2,2-bis(4-methylsulfonyloxyphenyl)hexafluoropropane of the amount shown in Table 1. The mixture was dried in vacuo for 24 hours, and the flask was filled with argon gas. In the flask was put 150 ml of dry N,N-dimethylacetamide, and the mixture was stirred at 70° C. in an argon stream, whereupon the reaction mixture turned brown. 2,4-Dichlorobenzotrifluoride in the amount shown in Table 1 was put in the flask by means of a syringe, and the reaction was continued at 70° C. for 20 hours. The reaction mixture was poured into a mixture of 500 ml of 36% hydrochloric acid and 2000 ml of methanol, and the precipitate formed was collected.

The precipitate was suspended in chloroform and extracted with a 2N hydrochloric acid aqueous solution. The chloroform layer was poured into acetone, and the precipitate was collected and dried to obtain a white powdered polymer. The results of analysis and evaluation on the resulting polymer are shown in Table 2 below.

Examples 16 to 18

Polymers were produced in the same manner as in Example 15, except for using the monomers shown in Table 1. The results of analysis and evaluation on the resulting copolymers are shown in Table 2 below.

Example 19

In a 500 ml-volume three-necked flask equipped with a tube for introducing argon gas and a thermometer were charged 7.5 g of sodium iodide, 1.3 g of anhydrous nickel chloride, 15.7 g of triphenylphosphine, 45.8 g of zinc powder activated with acetic acid, and 50.7 g of 9,9-bis(methylsulfonyloxyphenyl)fluorene. The mixture was dried in vacuo for 24 hours, and the flask was filled with argon gas. In the flask was put 150 ml of dry N,N-dimethylacetamide, and the mixture was stirred at 70° C. in an argon stream, whereupon the reaction mixture turned brown. The reaction was continued at 70° C. for 20 hours. The reaction mixture was poured into a mixture of 500 ml of 36% hydrochloric acid and 2000 ml of methanol, and the precipitate formed was collected.

The precipitate was suspended in chloroform and extracted with a 2N hydrochloric acid aqueous solution. The chloroform layer was poured into acetone, and the precipitate was collected and dried to obtain a white powdered polymer. The results of analysis and evaluation on the resulting polymer are shown in Table 2 below.

Example 20

A polymer was produced in the same manner as in Example 19, except for replacing the 9,9-bis(methylsulfonyloxyphenyl)fluorene (50.7 g) with the monomers shown in Table 1. The results of analysis and evaluation on the resulting copolymers are shown in Table 2 below.

TABLE 1

| | Monomer(s) | | | |
| --- | --- | --- | --- | --- |
| Example No. | Kind | Amount (g) (mol %) | Kind | Amount (g) (mol %) |
| 1 | 2,2-bis(4-methylsulfonyloxy-phenyl)hexafluoropropane | 49.2 (100) | — | — |
| 2 | bis(4-methylsulfonyloxyphenyl)-trifluoromethylphenylmethane | 50.0 (100) | — | — |
| 3 | bis(3-fluoro-4-methylsulfonyl-oxyphenyl)diphenylmethane | 54.4 (100) | — | — |
| 4 | 2,2-bis(4-methylsulfonyloxy-phenyl)hexafluoropropane | 39.4 (80) | 2,2-bis(4-methylsulfonyloxy-phenyl)propane | 7.68 (20) |
| 5 | 2,2-bis(4-methylsulfonyloxy-phenyl)hexafluoropropane | 39.4 (80) | bis(4-methylsulfonyloxyphenyl)-methane | 7.12 (20) |
| 6 | 2,2-bis(4-methylsulfonyloxy-phenyl)hexafluoropropane | 29.5 (60) | bis(3,3'-allyl-4,4'-(p-fluoro-phenyl)sulfonyloxy)biphenyl | 23.3 (40) |
| 7 | 2,2-bis(4-methylsulfonyloxy-phenyl)hexafluoropropane | 39.4 (80) | 2,4-dichlorobenzophenone | 5.02 (20) |
| 8 | 2,2-bis(4-methylsulfonyloxy-phenyl)hexafluoropropane | 39.4 (80) | 2,4-dichlorobenzyl alcohol | 3.54 (20) |
| 9 | 2,2-bis(4-methylsulfonyloxy-phenyl)hexafluoropropane | 39.4 (80) | 3,5-dichlorobenzyl alcohol | 3.54 (20) |
| 10 | 2,2-bis(4-methylsulfonyloxy-phenyl)hexafluoropropane | 29.5 (60) | 3,5-dichlorobenzyl alcohol | 7.08 (40) |
| 11 | 2,2-bis(4-methylsulfonyloxy-phenyl)hexafluoropropane | 41.8 (80) | 3,6-dichlorophthalic acid anhydride | 3.26 (20) |
| 12 | 2,2-bis(4-methylsulfonyloxy-phenyl)hexafluoropropane | 39.4 (60) | 3,5-dichlorophenyl-t-butoxy-carbonyl | 5.26 (40) |
| 13 | 2,2-bis(4-methylsulfonyloxy-phenyl)hexafluoropropane | 29.5 (80) | 3,5-dichlorophenyl-t-butoxy-carbonyl | 10.5 (20) |
| 14 | 2,2-bis(4-methylsulfonyloxy-phenyl)hexafluoropropane | 39.4 (80) | methyl 3,5-dichlorobenzoate | 4.10 (20) |

TABLE 1-continued

| Example No. | Monomer(s) Kind | Amount (g) (mol %) | Kind | Amount (g) (mol %) |
|---|---|---|---|---|
| 15 | 2,2-bis(4-methylsulfonyloxy-phenyl)hexafluoropropane | 29.5 (60) | 2,4-dichlorobenzotrifluoride | 8.60 (40) |
| 16 | 2,2-bis(4-methylsulfonyloxy-phenyl)hexafluoropropane | 39.4 (80) | 2,4-dichloroanisole | 3.54 (20) |
| 17 | 9,9-bis(4-methylsulfonyloxy-phenyl)fluorene | 42.6 (80) | 2,4-dichlorobenzotrifluoride | 3.44 (20) |
| 18 | 9,9-bis(4-methylsulfonyloxy-phenyl)fluorene | 25.4 (50) | 2,4-dichlorobenzotrifluoride | 11.0 (50) |
| 19 | 9,9-bis(4-methylsulfonyloxy-phenyl)fluorene | 50.7 (100) | — | — |
| 20 | 9,9-bis(4-methylsulfonyloxy-phenyl)fluorene | 30.4 (60) | bis(4-methylsulfonyloxyphenyl)-diphenylmethane | 23.3 (40) |

TABLE 2

| Example No. | Mw | $Td_5$ (°C.) | Tg (°C.) | $\epsilon$ | Solubility NMP | cHN | PGMEA |
|---|---|---|---|---|---|---|---|
| 1 | 34700 | 533 | 251 | 2.2 | A | A | A |
| 2 | 16600 | 511 | 266 | 2.3 | A | A | A |
| 3 | 9600 | 549 | 234 | 2.4 | A | A | A |
| 4 | 25800 | 505 | 239 | 2.3 | A | A | A |
| 5 | 25200 | 501 | 230 | 2.3 | A | A | A |
| 6 | 20800 | 470 | * | 2.3 | A | A | A |
| 7 | 28100 | 521 | 186 | 2.4 | A | A | A |
| 8 | 14400 | 514 | 198 | 2.3 | A | A | A |
| 9 | 15200 | 502 | 210 | 2.3 | A | A | A |
| 10 | 11800 | 493 | 205 | 2.4 | A | A | A |
| 11 | 43300 | 517 | 230 | 2.3 | A | A | A |
| 12 | 20500 | 512 | 242 | 2.3 | A | A | A |
| 13 | 25900 | 510 | 235 | 2.4 | A | A | A |
| 14 | 12500 | 511 | 233 | 2.3 | A | A | A |
| 15 | 20000 | 517 | 215 | 2.2 | A | A | A |
| 16 | 14400 | 462 | 183 | 2.3 | A | A | A |
| 17 | 23400 | 567 | >350 | 2.4 | A | A | C |
| 18 | 25200 | 553 | >350 | 2.4 | A | A | C |
| 19 | 21800 | 576 | >350 | 2.4 | A | B | C |
| 20 | 20100 | 563 | >350 | 2.4 | A | A | C |

Note: * undetected.

In all of Examples 1 to 20 the polymer had a volume resistivity of $10^{16}$ Ω.cm² or higher and showed satisfactory film-forming properties.

9) IR Analysis

Figure 2:
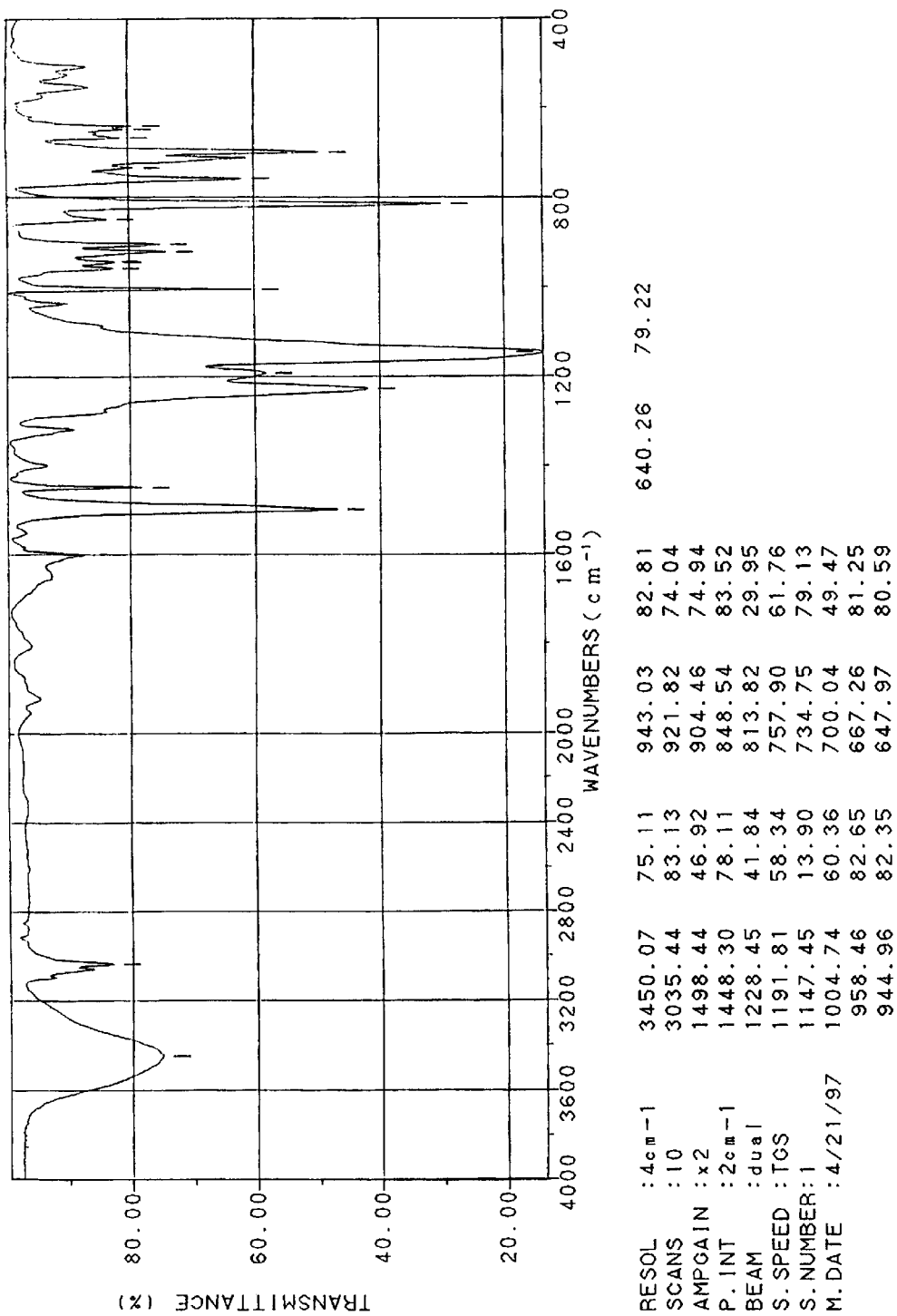
Figure 3:
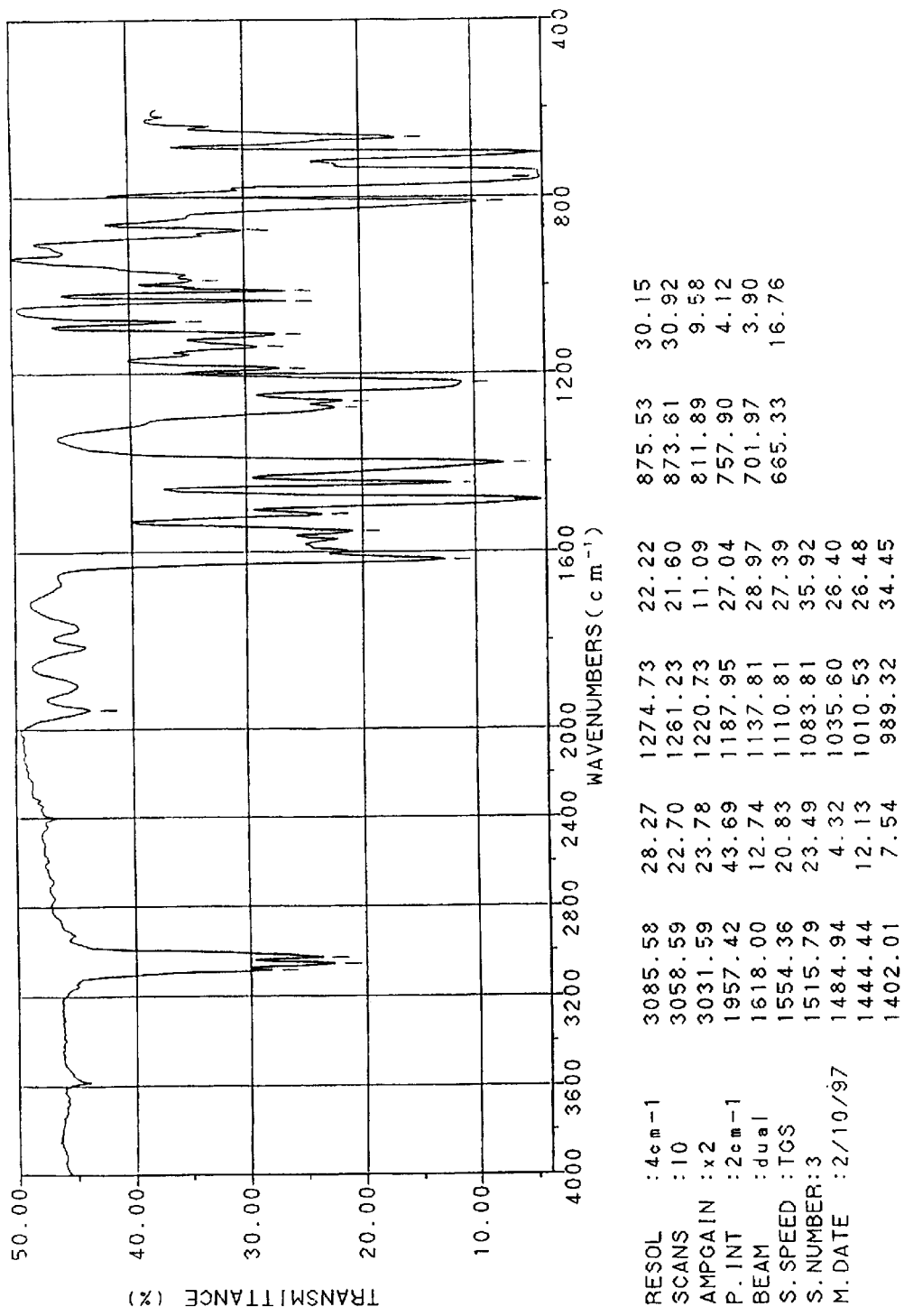
Figure 4:
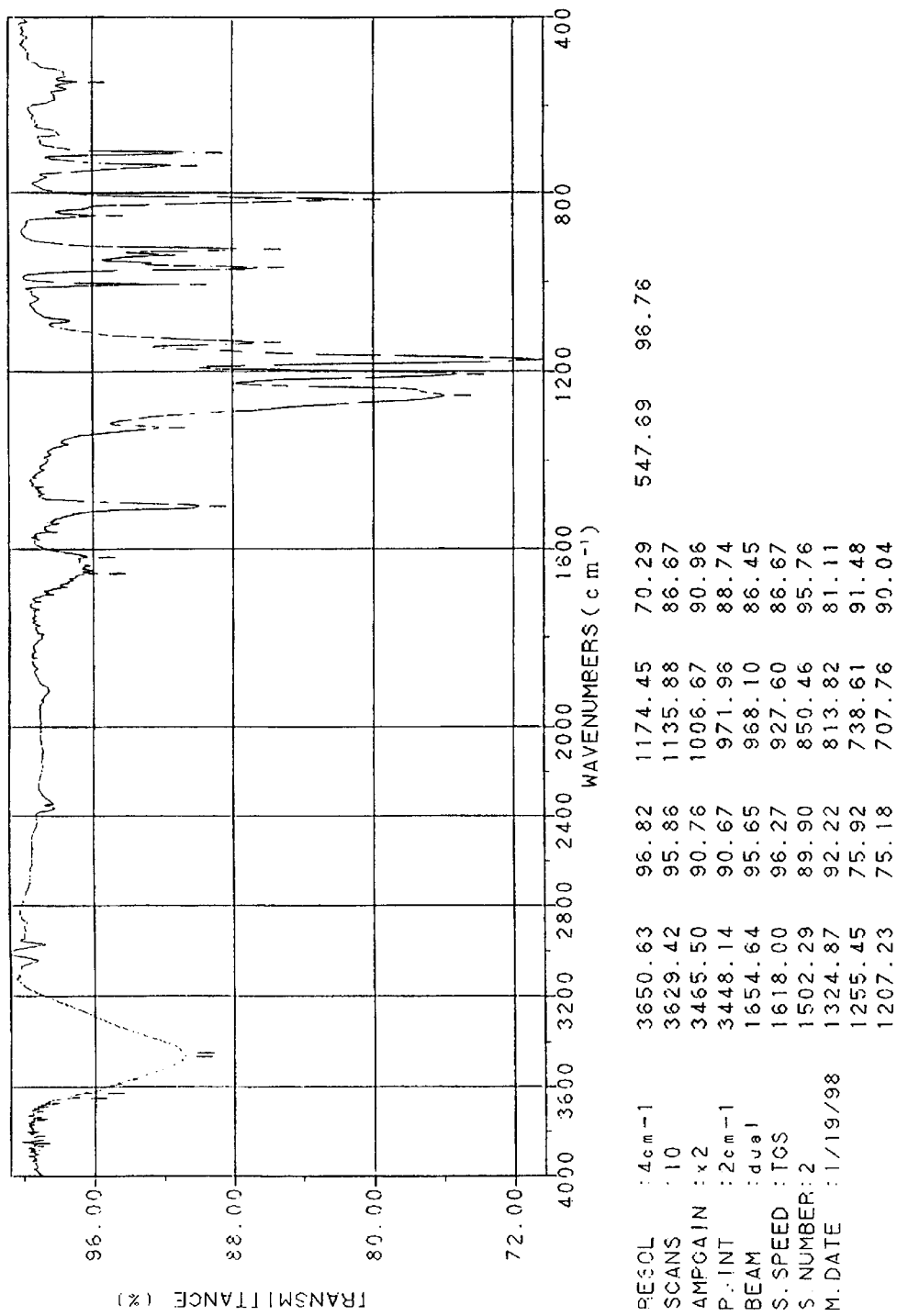
Figure 5:
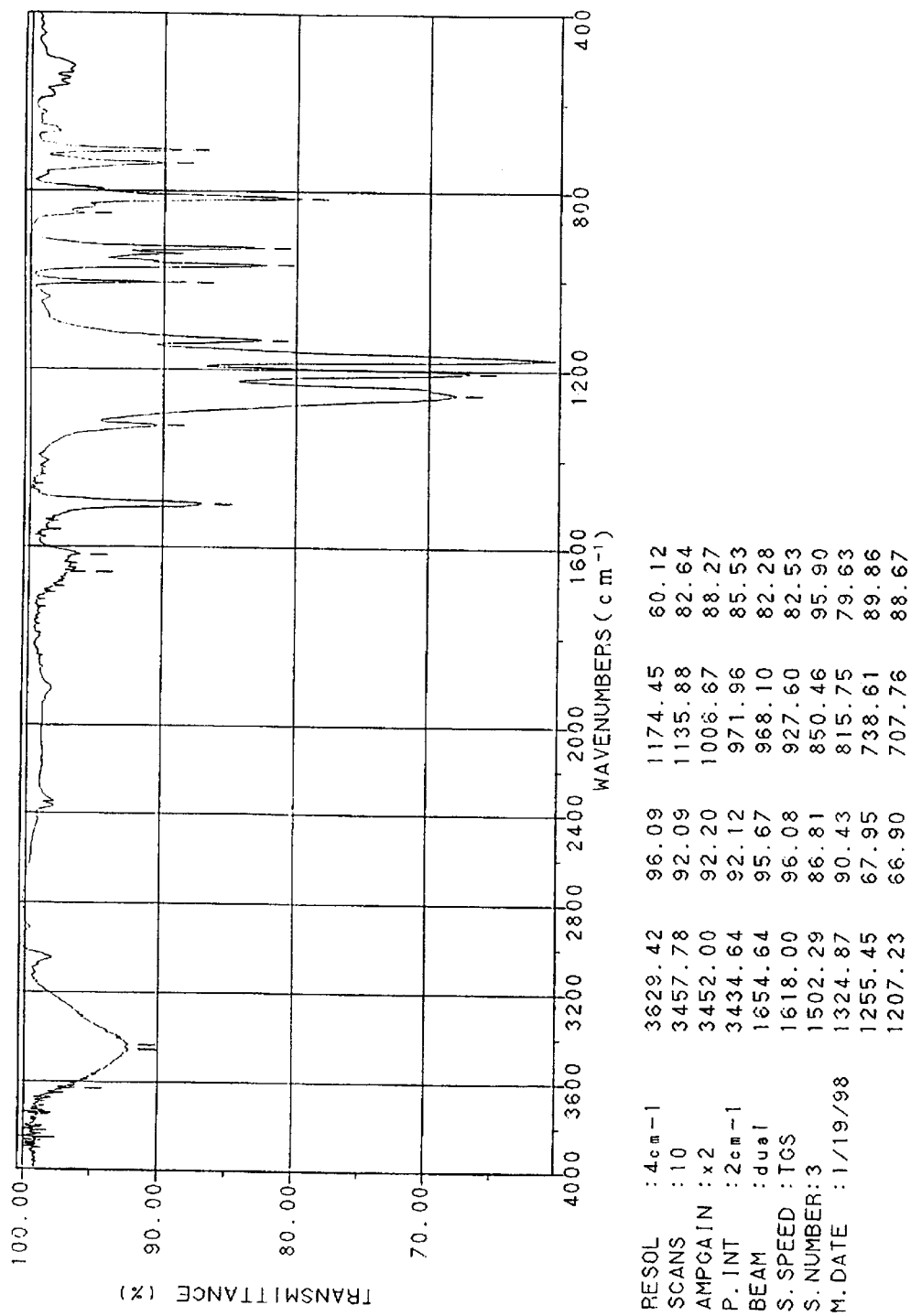
Figure 6:
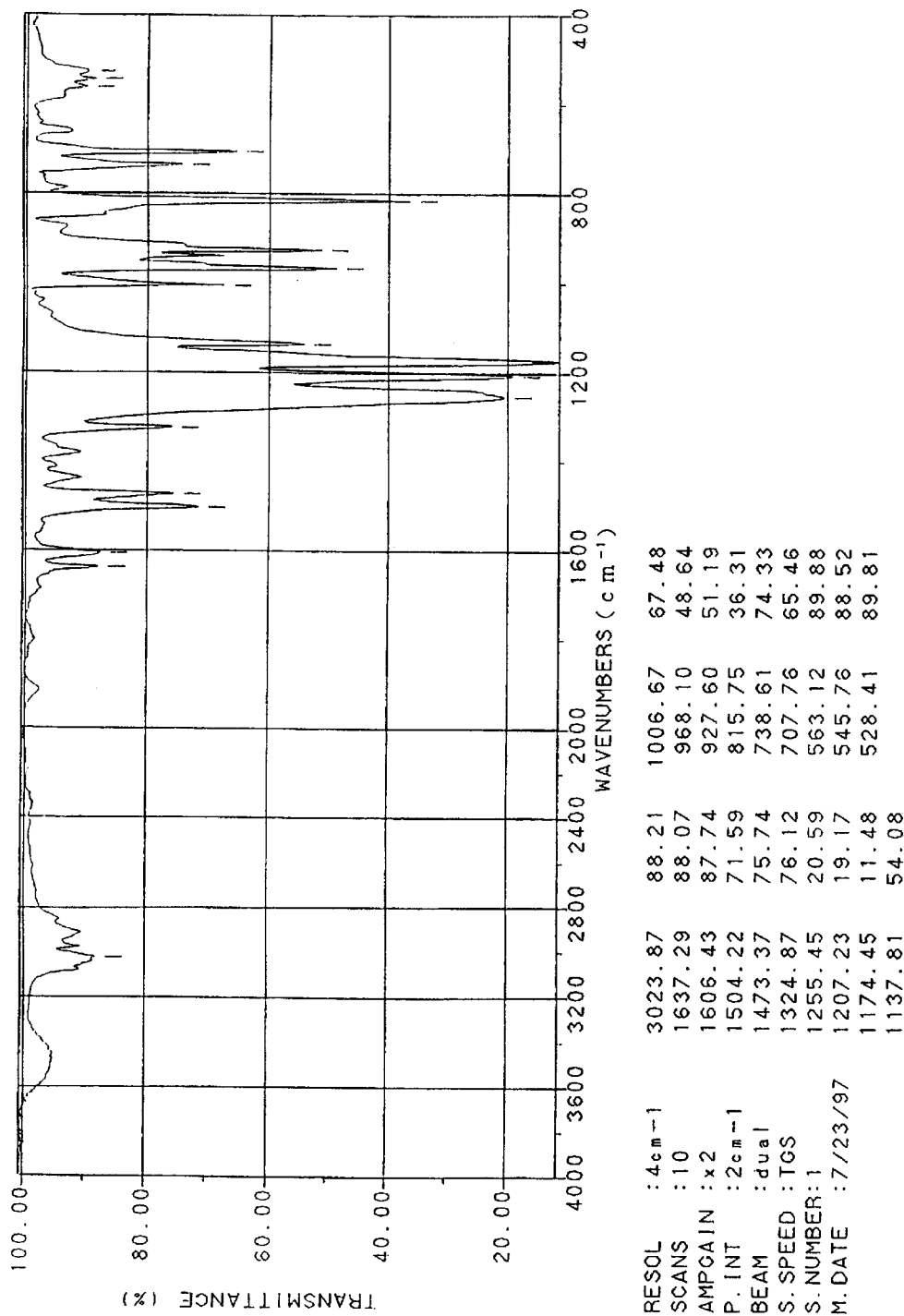
Figure 7:
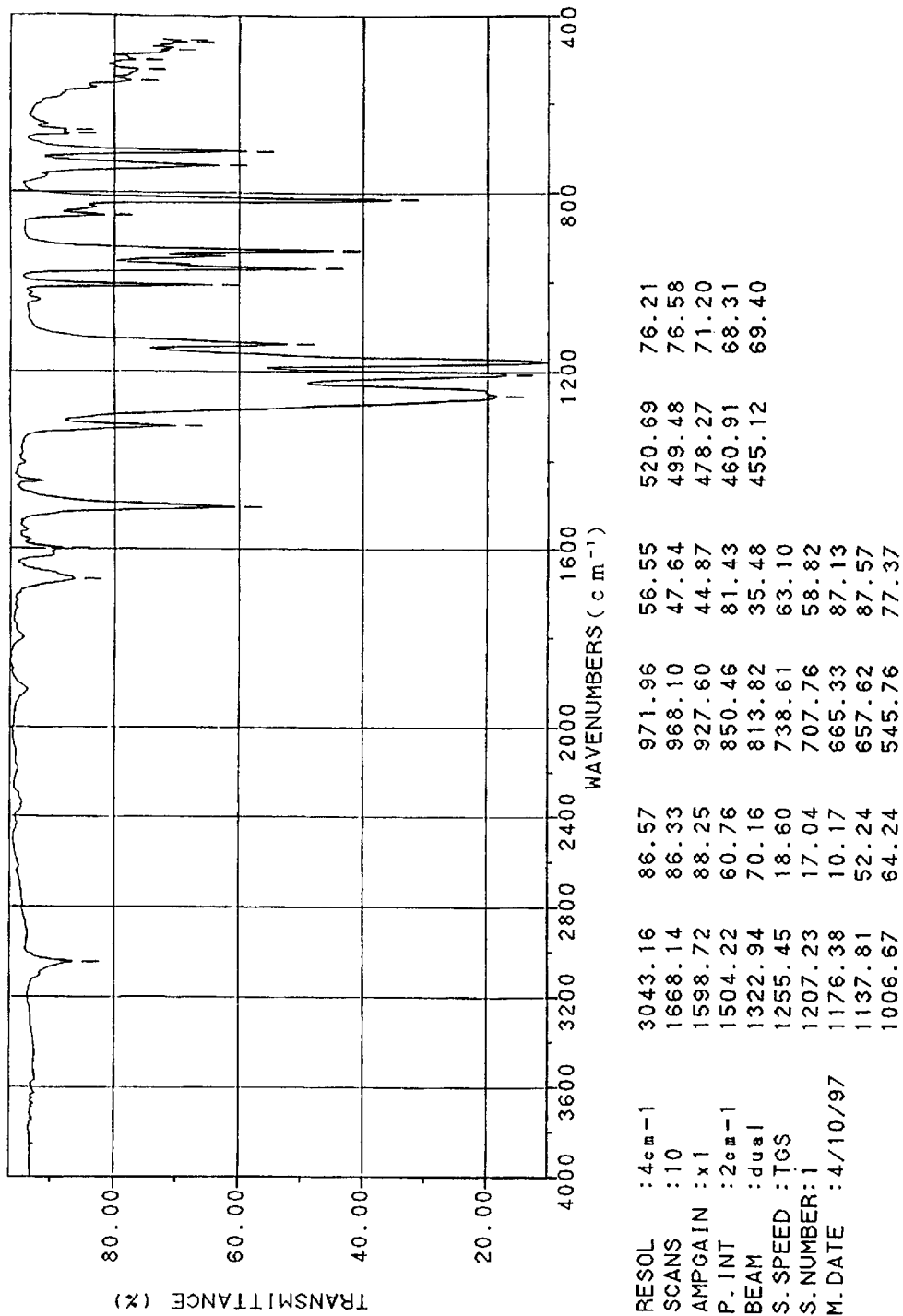
Figure 8:
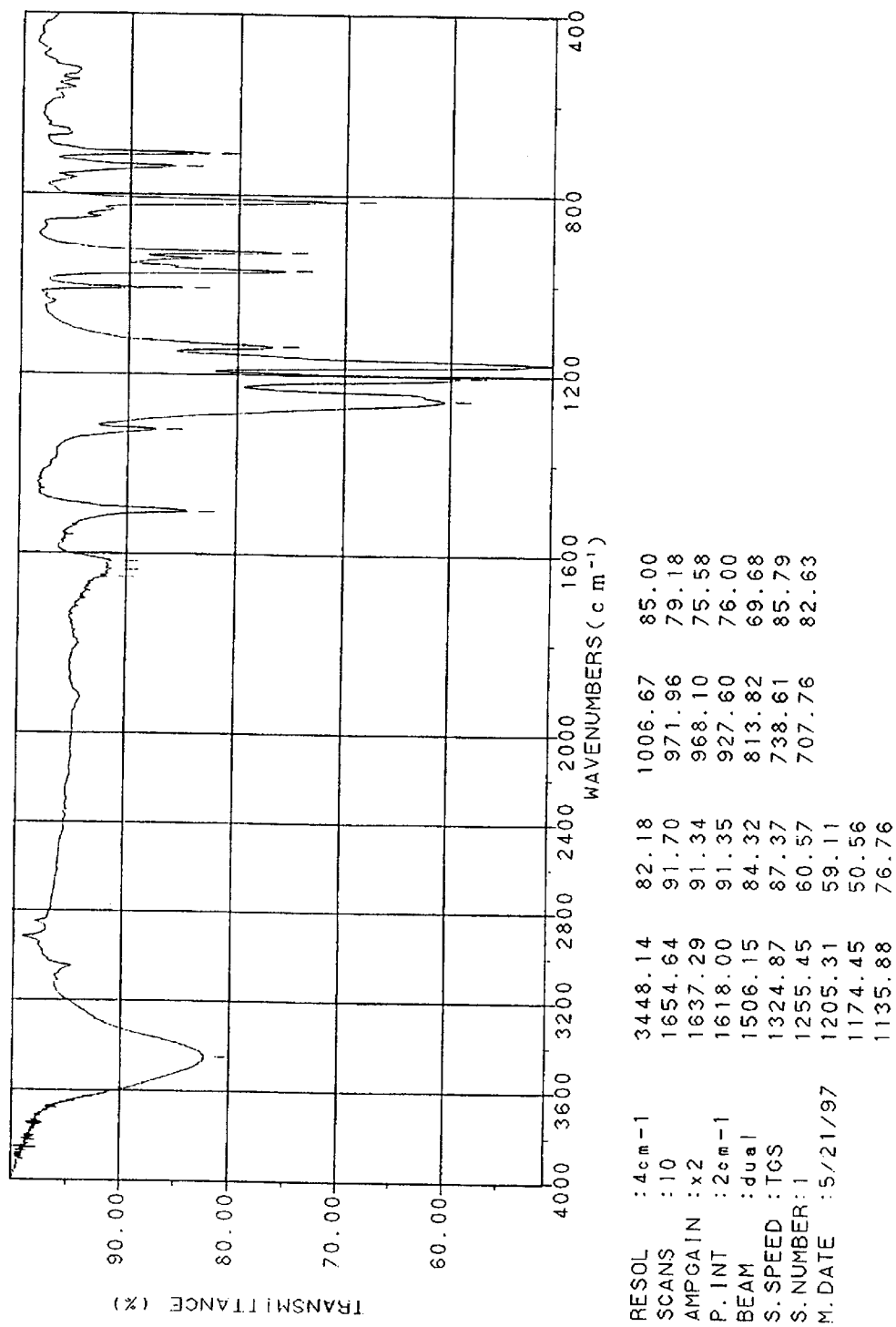
Figure 9:
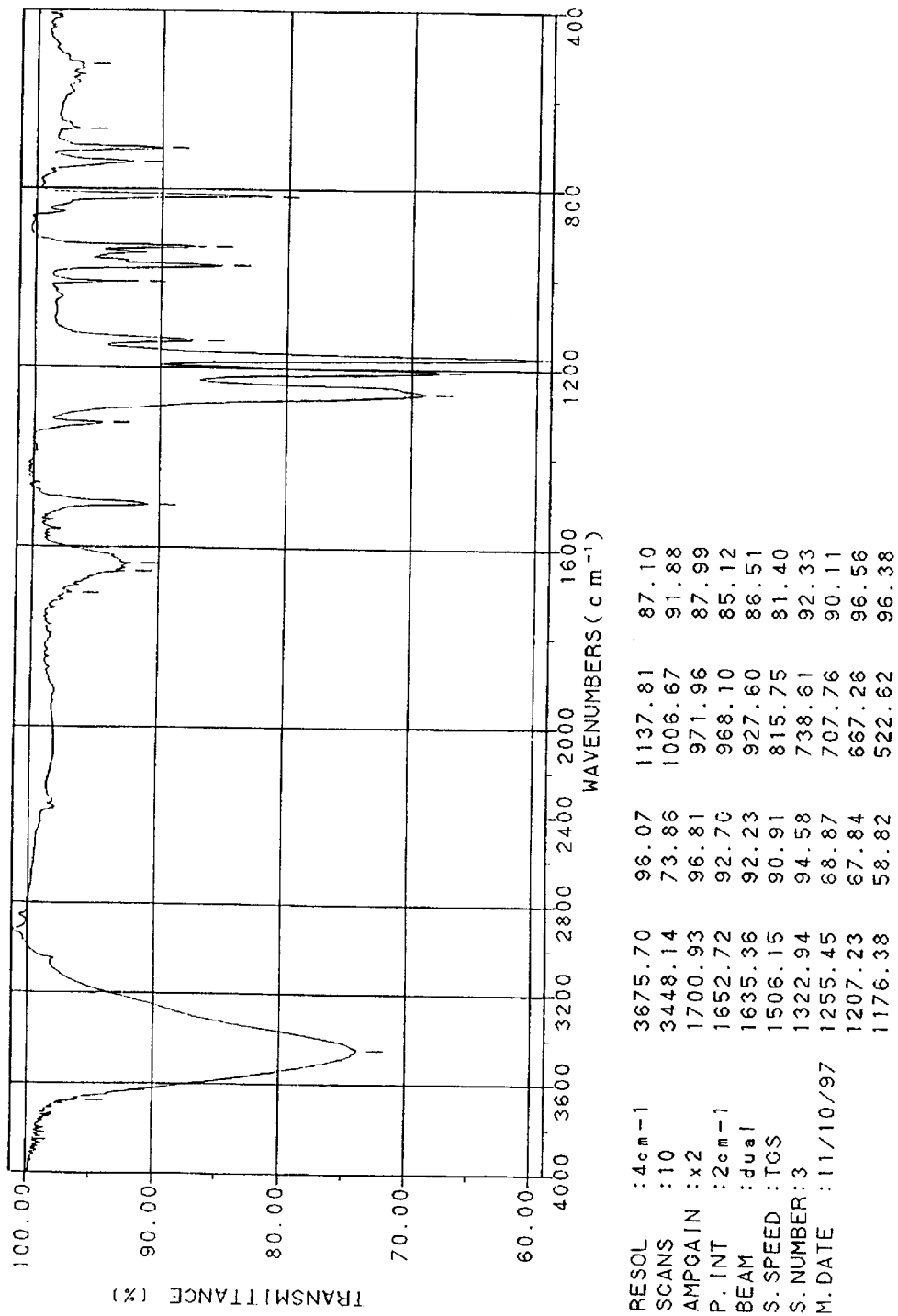
Figure 10:
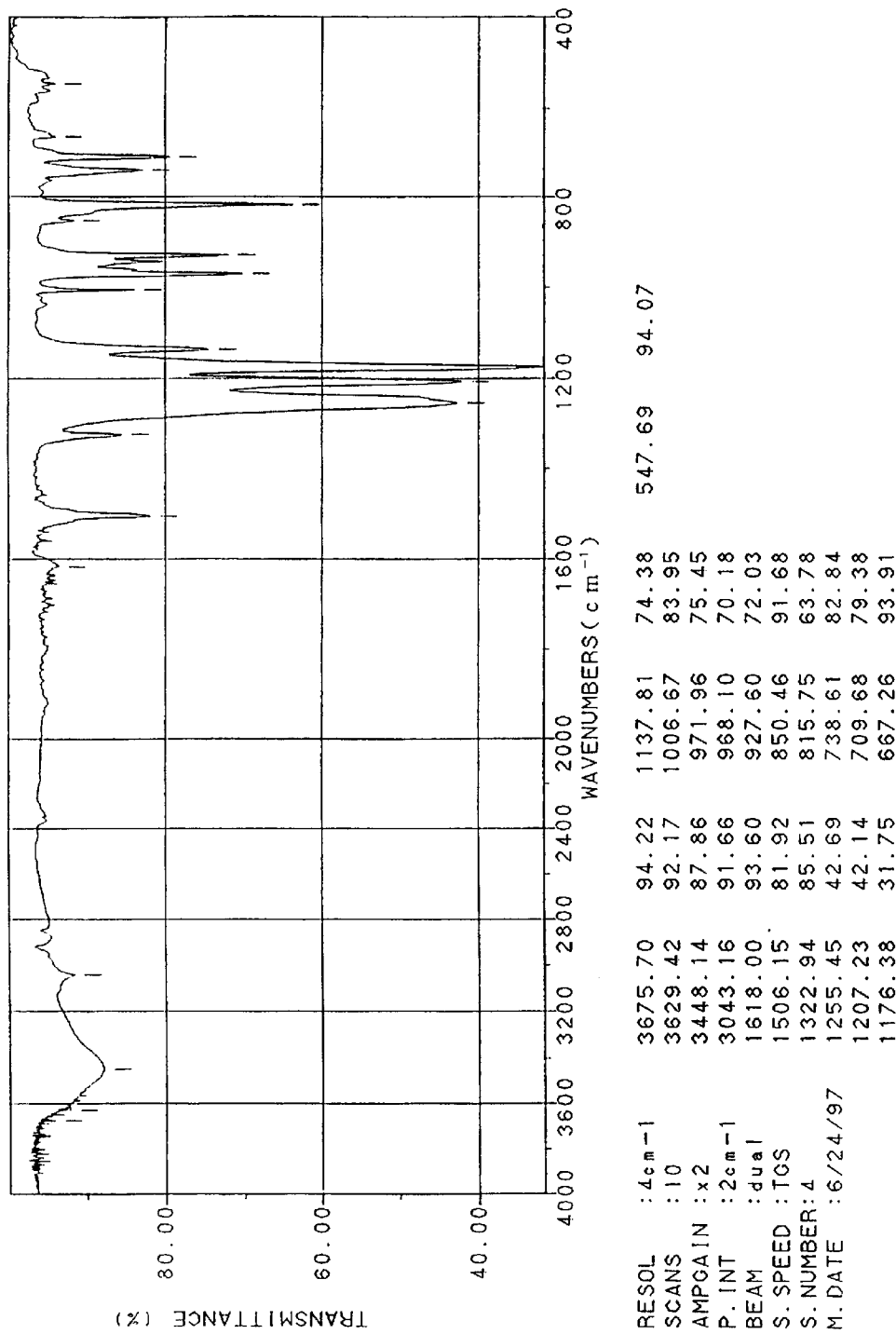
Figure 11:
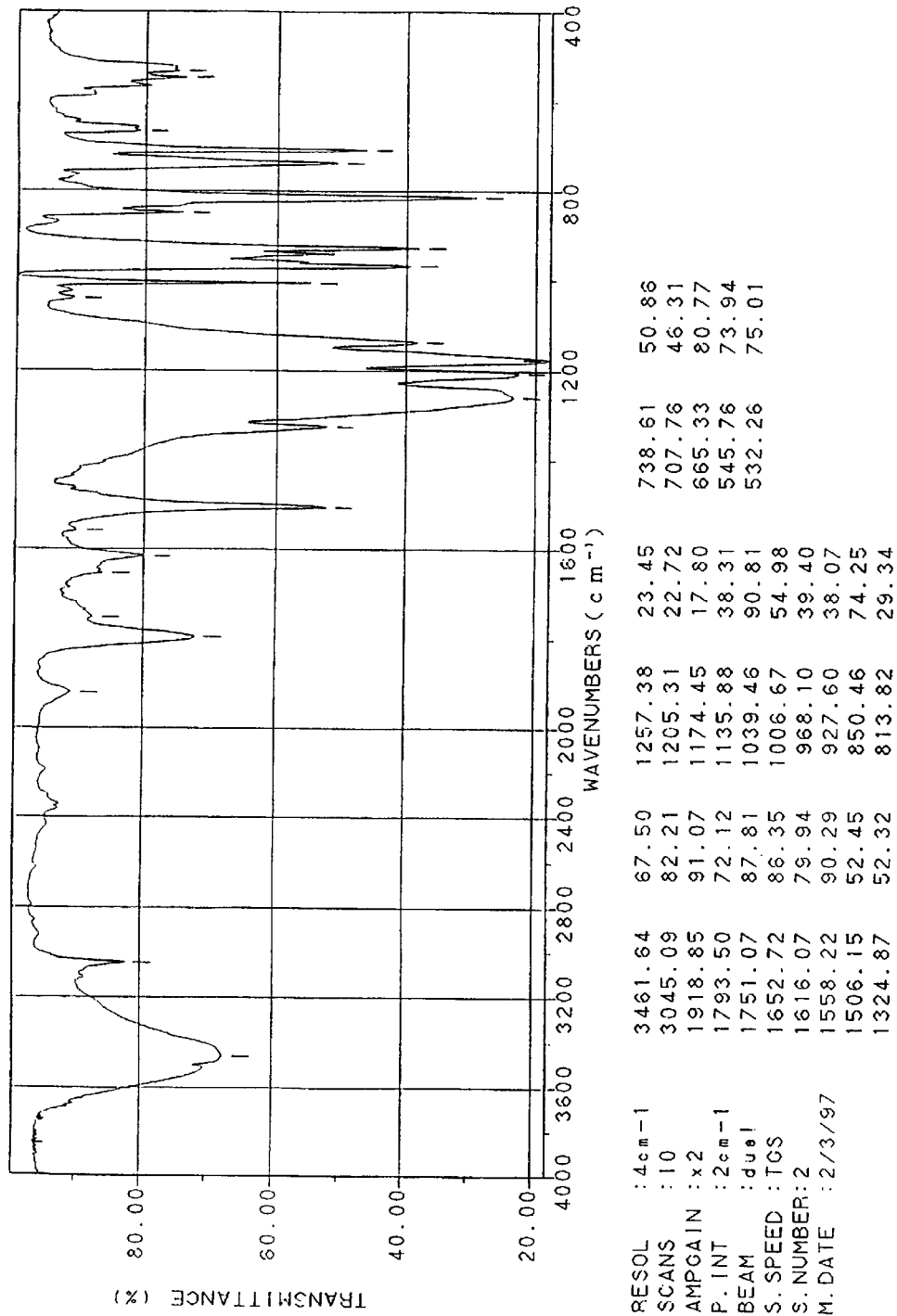
Figure 12:
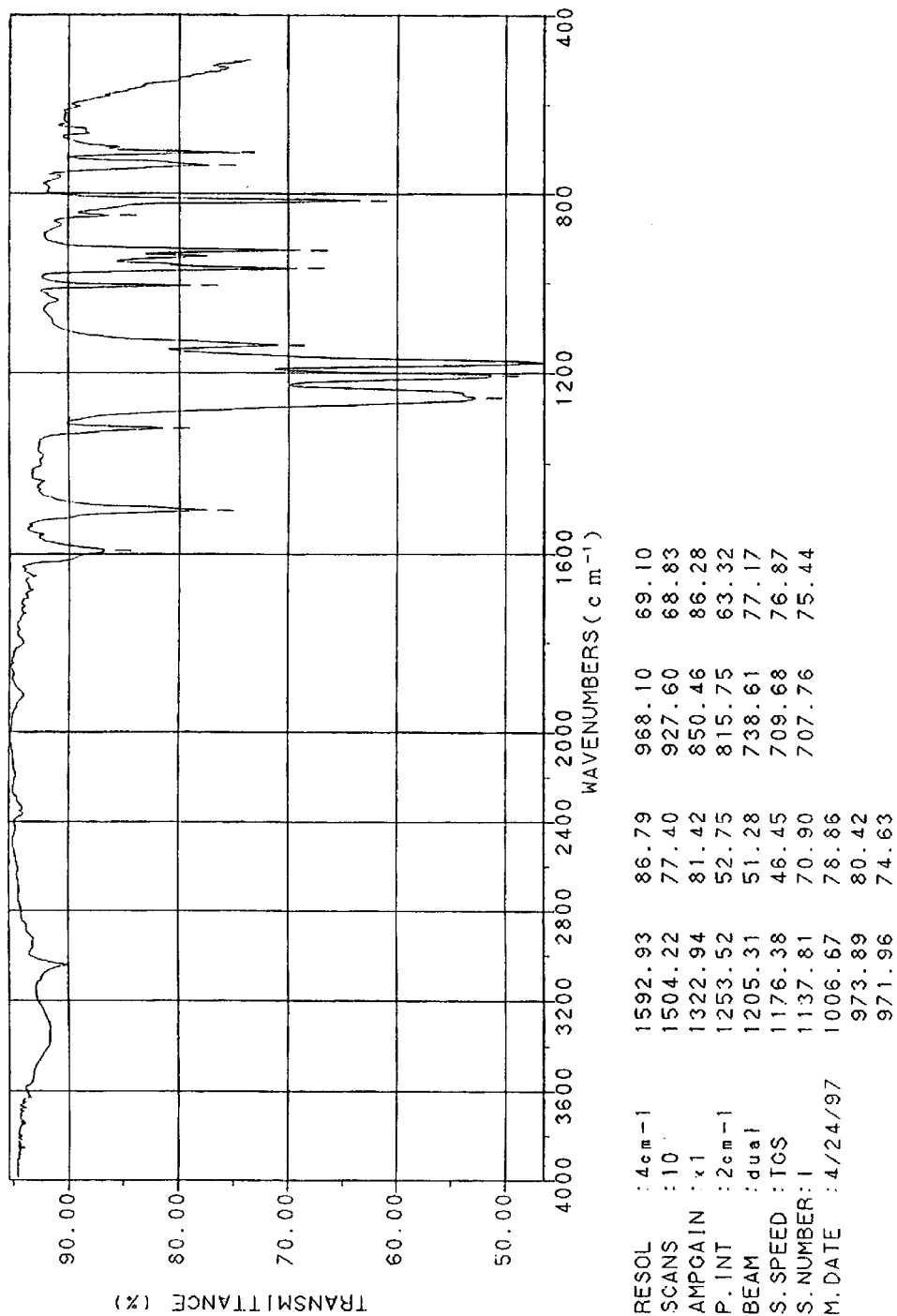
Figure 13:
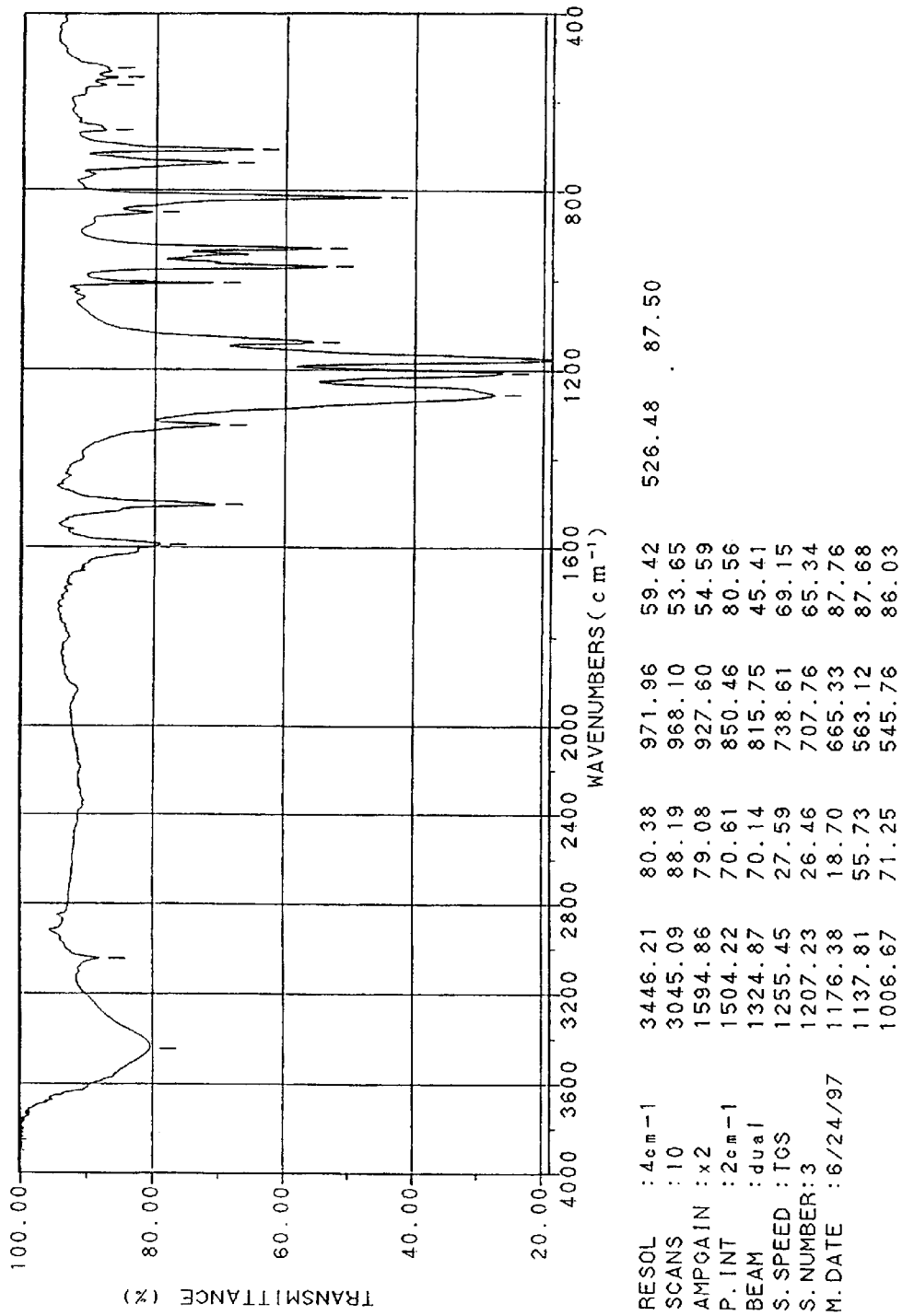
Figure 14:
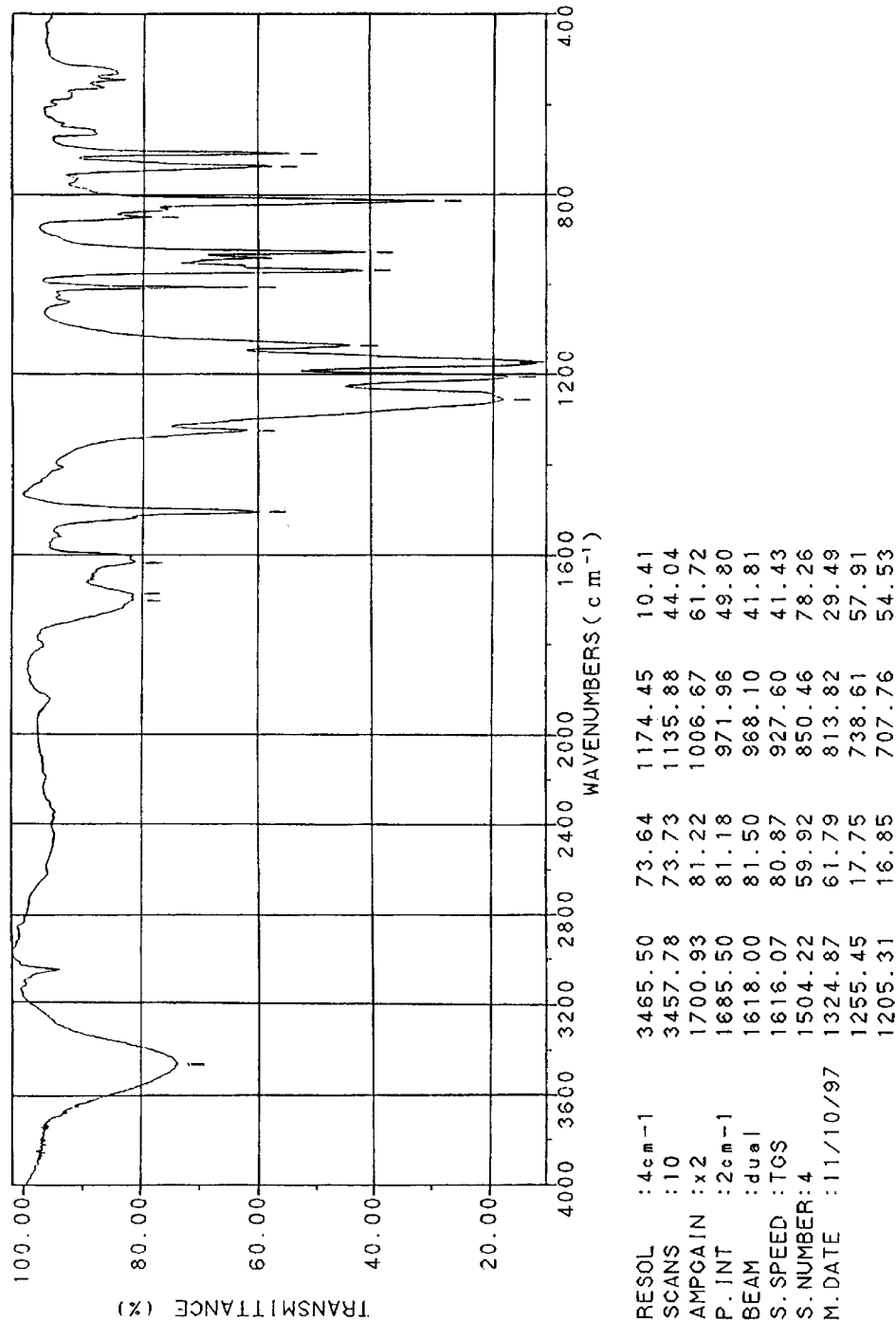
Figure 15:
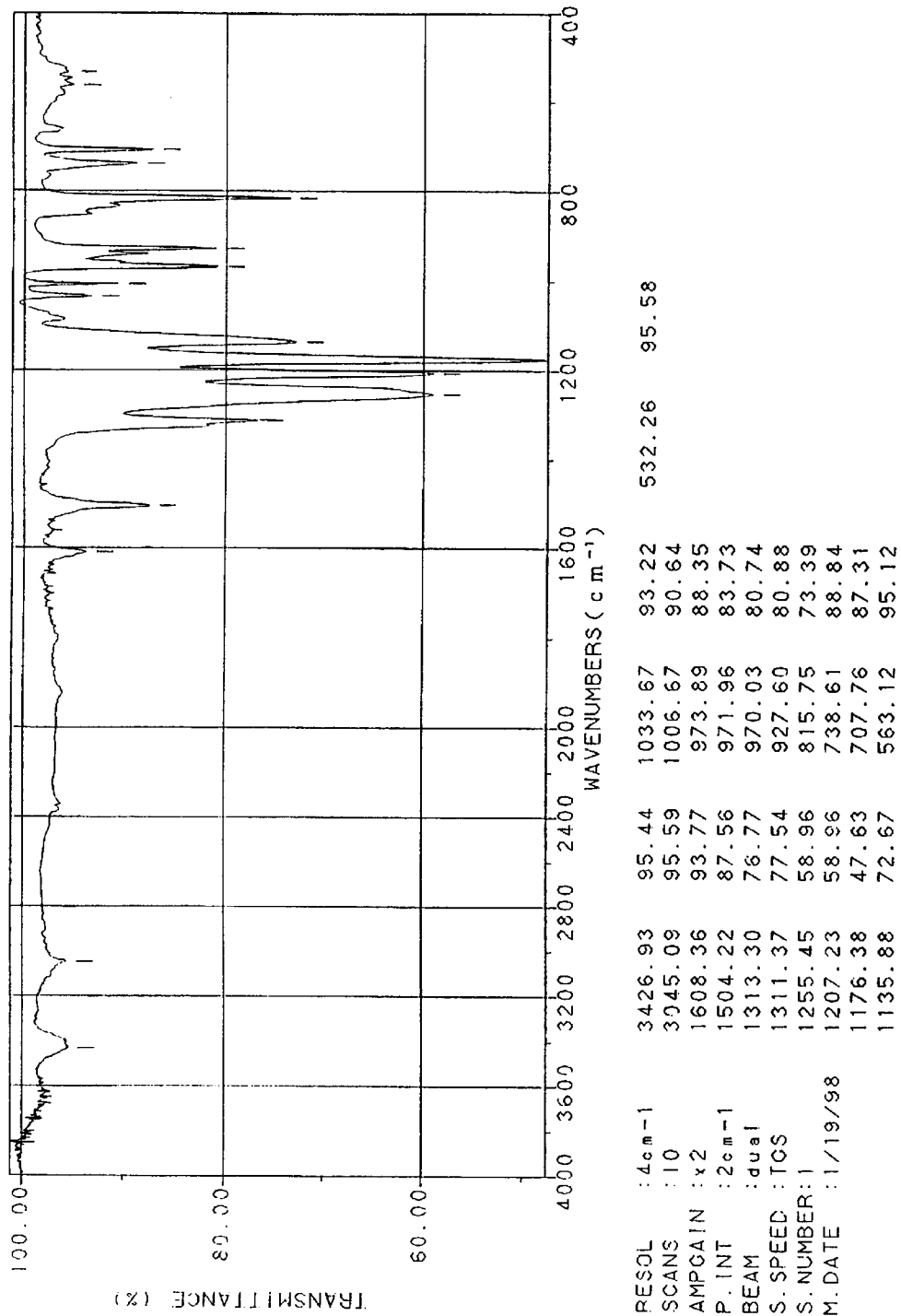
Figure 16:
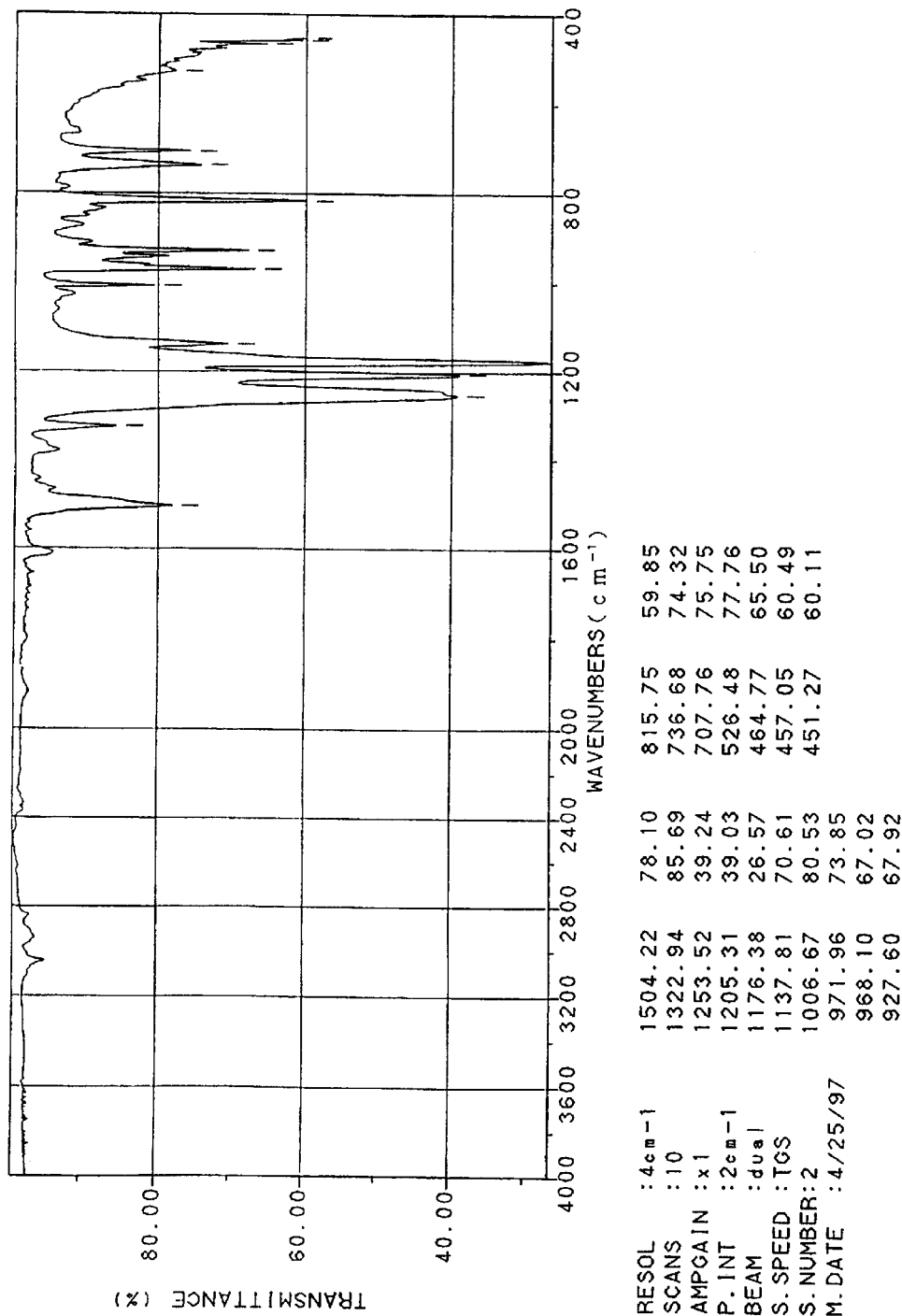
Figure 17:
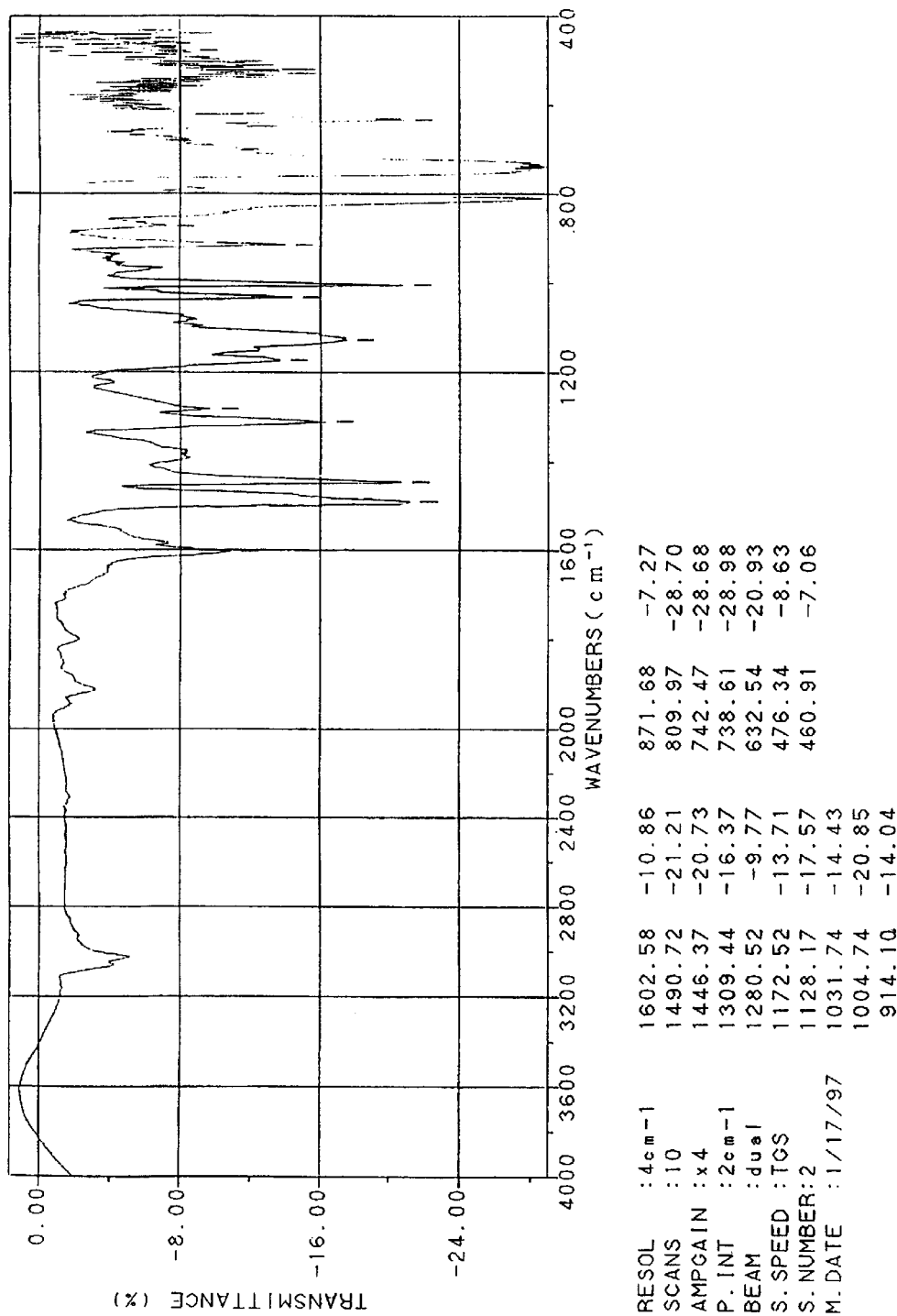
Figure 18:
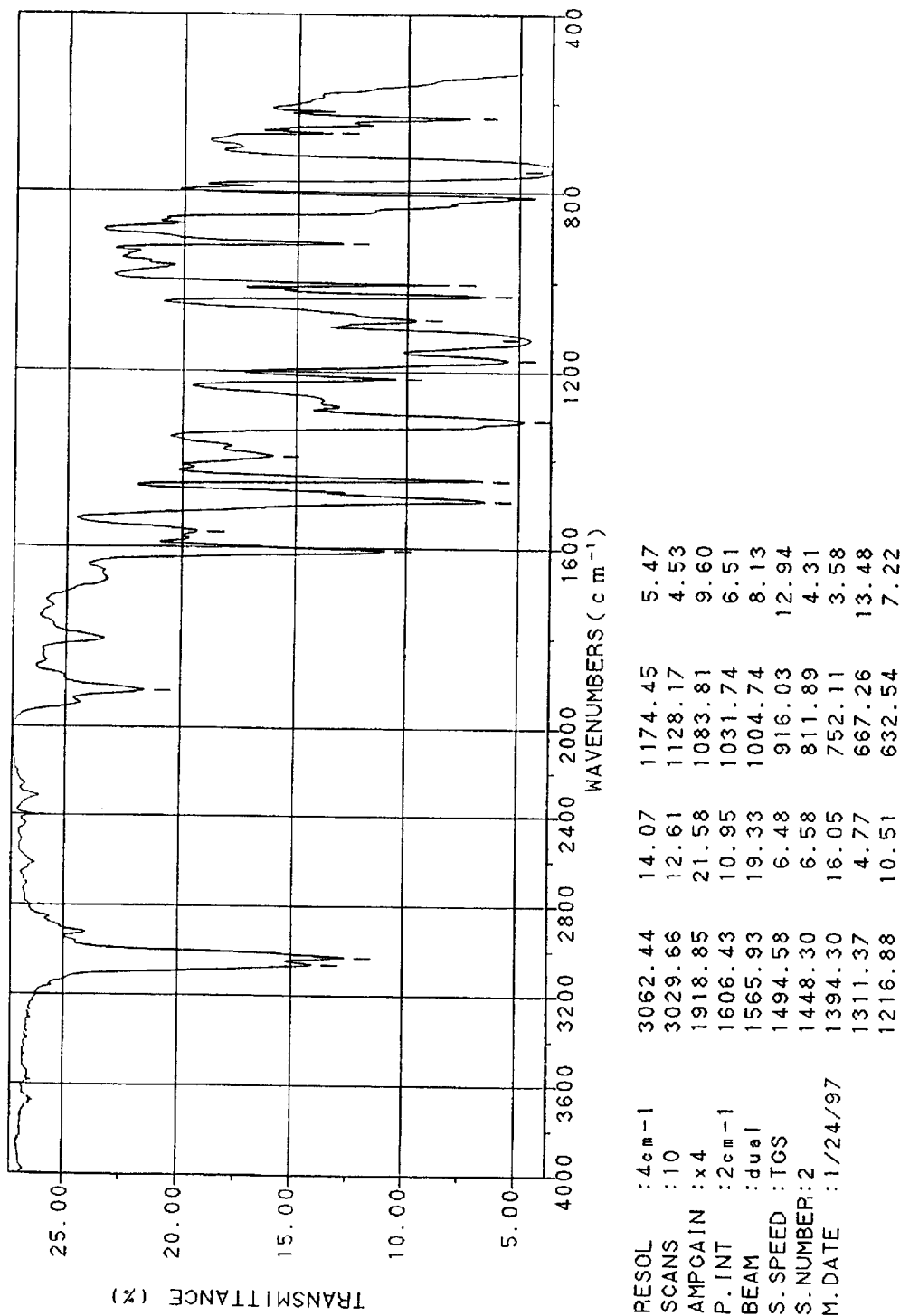
Figure 19:
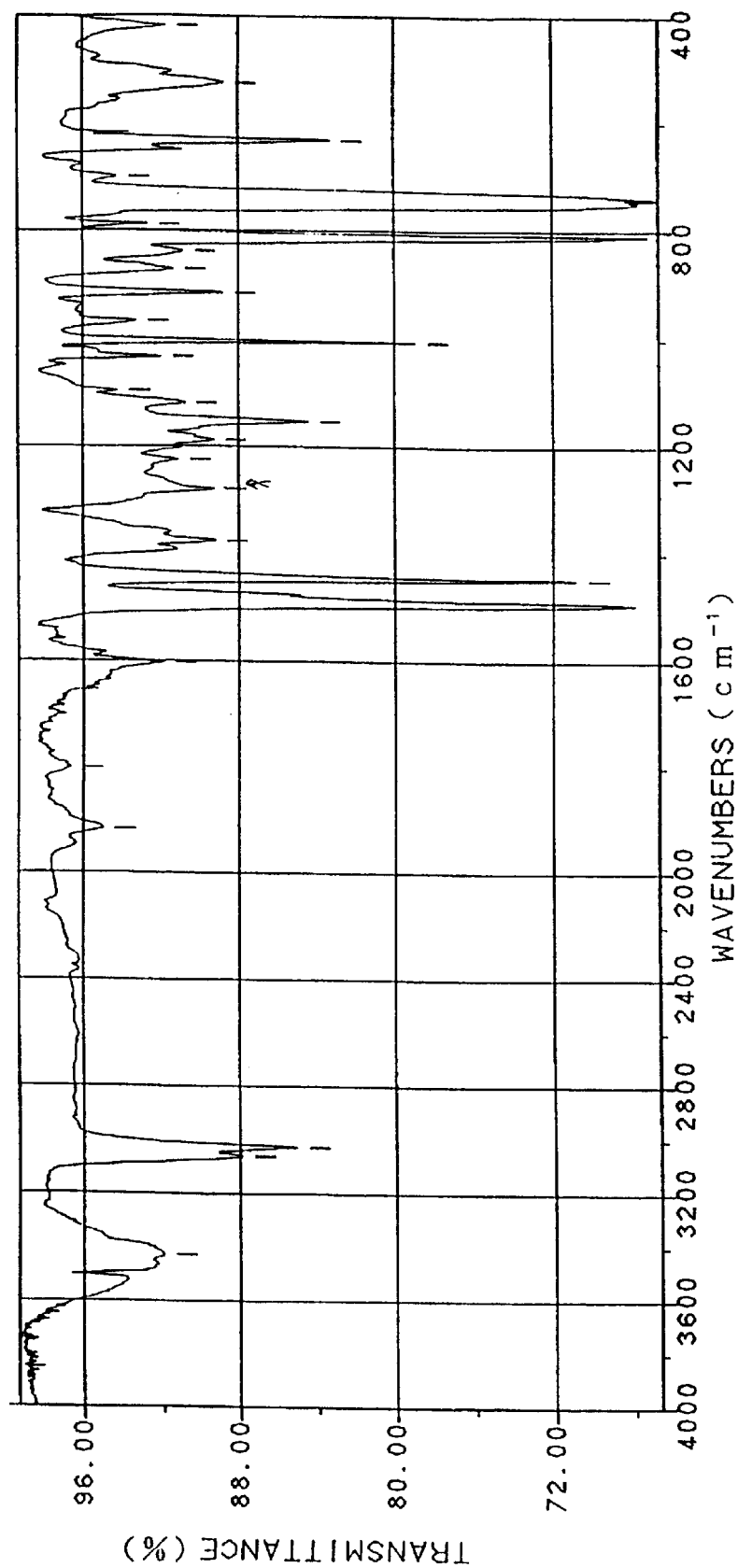
Figure 20:
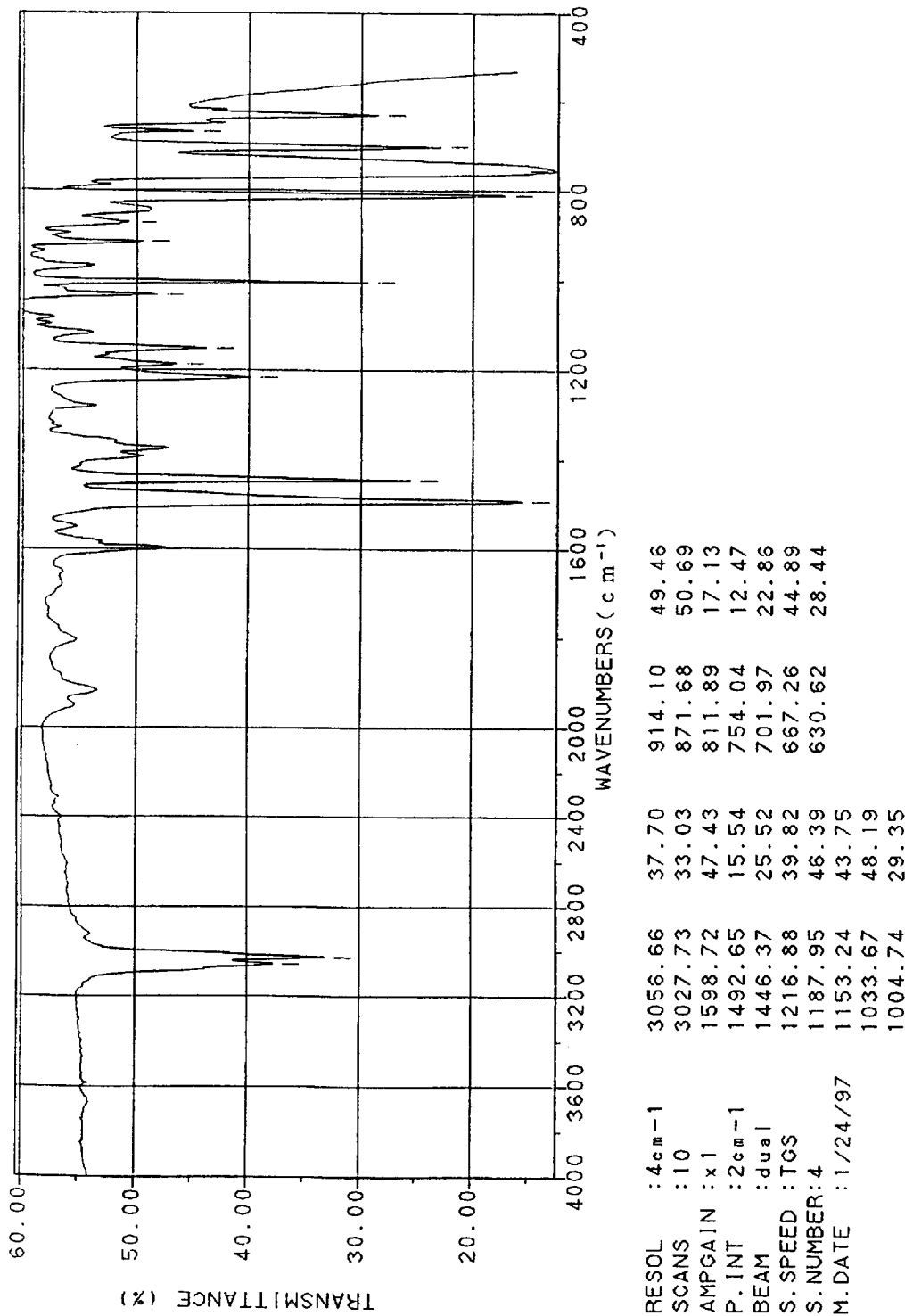

The polymers obtained in Examples 1 to 20 were analyzed by IR absorption spectrum by KBr tablet method. The results obtained are shown in FIGS. 1 through 20.

Test Example 1

A hundred parts of the polymer obtained in Example 6, parts of 2,5-dimethyl-2,5-di(t-butylperoxy)hexyn-3, and 1 part of 3-glycidyloxypropyltrimethoxysilane were dissolved in 300 parts of propylene glycol 1-monomethyl ether 2-acetate. The resulting polymer composition was applied by spin coating onto a glass substrate to a thickness of 3 μm and baked at 80° C. and then 120° C. for 2 minutes each and finally baked in a nitrogen stream at 250° C. for 30 minutes to obtain a transparent coating film. The coating film was evaluated to obtain the results shown in Table 3 below.

Test Example 2

A hundred parts of the polymer obtained in Example 8, 40 parts of Cymel 300 (produced by Mitsui-Cytec, Ltd.), and 1 part of 3-glycidyloxypropyltrimethoxysilane were dissolved in 300 parts of propylene glycol 1-monomethyl ether 2-acetate. The resulting polymer composition was applied by spin coating onto a glass substrate to a thickness of 3 μm and baked at 80° C. and 120° C. for 2 minutes each and finally at 230° C. for 30 minutes to obtain a transparent coating film. The coating film was evaluated to obtain the results shown in Table 3.

Test Examples 3 to 8

A coating film was prepared in the same manner as in Test Example 2, except for using the polymer shown in Table 3. The results of evaluation are shown in Table 3.

TABLE 3

| Test Example No. | Polymer | Dielectric Constant | Solvent Resistance NMP | DMSO | PGMEA |
|---|---|---|---|---|---|
| 1 | Ex. 6 | 2.4 | A | A | A |
| 2 | Ex. 8 | 2.5 | A | A | A |
| 3 | Ex. 9 | 2.5 | A | A | A |
| 4 | Ex. 10 | 2.5 | A | A | A |
| 5 | Ex. 11 | 2.5 | A | A | A |
| 6 | Ex. 12 | 2.5 | A | A | A |
| 7 | Ex. 13 | 2.5 | A | A | A |
| 8 | Ex. 14 | 2.5 | A | A | A |

INDUSTRIAL APPLICABILITY

In the present invention, a monomer prepared by sulfonating an economically available bisphenol compound is polymerized in the presence of a transition metal catalyst. There is produced through an economical process a polymer satisfying the requirements of heat resistance, low dielectric properties, and processability. Further, the polymer provides a highly transparent film.

Where the above-mentioned monomer is copolymerized with a dihalo- or bissulfonate compound having a reactive functional group or a precursor thereof, copolymers exhibiting solvent resistance and adhesion in addition to the above characteristics can be obtained.

What is claimed is:

1. A process for producing a phenylene-containing polymer comprising polymerizing a monomer comprising not less than 50 mol % of a compound represented by formula (I):

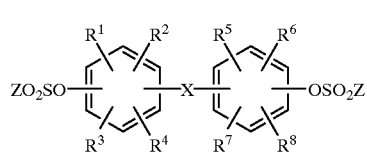
(I)

wherein X represents a group of formula: —CYY'—, wherein Y and Y', which may be the same or different, each represent a halogenated alkyl group, a hydrogen atom or an aryl group, or a fluorenylene group; $R^1$, $R^2$, $R^3$, $R^4$, $R^5$, $R^6$, $R^7$, and $R^8$, which may be the same or different, each represent a hydrogen atom, a halogen atom, an alkyl group, a halogenated alkyl group, an allyl group or an aryl group; and Z represents an alkyl group, a halogenated alkyl group or an aryl group, in the presence of a catalyst system containing a transition metal compound.

2. The process according to claim 1, wherein said monomer comprises 60 mol % or more of the compound represented by formula (I).

3. The process according to claim 1, wherein said monomer comprises 80 mol % or more of the compound represented by formula (I).

4. The process according to claim 1, wherein said monomer consists solely of the compound represented by formula (I).

5. The process according to claim 1, wherein said monomer comprises two or more kinds of the compound represented by formula (I).

6. The process according to claim 1, wherein said monomer comprises 50 to 95 mol % of the compound represented by formula (I) and 5 to 50 mol % of a compound represented by formula (II):

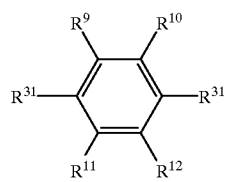
(II)

wherein $R^9$, $R^{10}$, $R^{11}$, and $R^{12}$, which may be the same or different, each represent a hydrogen atom, a halogen atom, a hydroxy group or a monovalent organic group; and $R^{31}$ represents a halogen atom or a group of formula: —$OSO_2Z$, wherein Z represents an alkyl group, a halogenated alkyl group or an aryl group.

7. The process according to claim 6, wherein at least one of $R^9$, $R^{10}$, $R^{11}$, and $R^{12}$ in formula (II) is a monovalent reactive group or a precursor thereof.

8. The process according to claim 7, wherein said monovalent reactive group or a precursor thereof is selected from the group consisting of a hydroxyl group, a carboxyl group, an allyl group, and an alkoxycarbonyloxy group.

9. The process according to claim 1, wherein said monomer comprises 50 to 95 mol % of the compound represented by formula (I) and 5 to 50 mol % of a compound represented by formula (III):

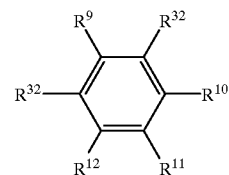
(III)

wherein $R^9$, $R^{10}$, $R^{11}$, and $R^{12}$, which may be the same or different, each represent a hydrogen atom, a halogen atom, a hydroxyl group or a monovalent organic group; and $R^{32}$ represents a halogen atom or a group of formula: —$OSO_2Z$, wherein Z represents an alkyl group, a halogenated alkyl group or an aryl group.

10. The process according to claim 9, wherein at least one of $R^9$, $R^{10}$, $R^{11}$, and $R^{12}$ in formula (III) is a monovalent reactive group or a precursor thereof.

11. The process according to claim 10, wherein said monovalent reactive group or a precursor thereof is selected from the group consisting of a hydroxyl group, a carboxyl group, an allyl group, and an alkoxycarbonyloxy group.

12. The process according to claim 1, wherein said monomer comprises 50 to 95 mol % of the compound represented by formula (I) and 5 to 50 mol % of a compound represented by formula (IV):

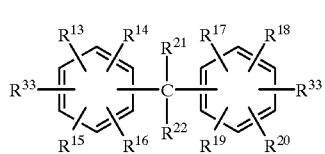
(IV)

wherein $R^{21}$ and $R^{22}$, which may be the same or different, each represent an alkyl group or an aryl group, provided that at least one of $R^{21}$ and $R^{22}$ is an alkyl group; $R^{13}$, $R^{14}$, $R^{15}$, $R^{16}$, $R^{17}$, $R^{18}$, $R^{19}$, and $R^{20}$, which may be the same or different, each represent a hydrogen atom, a halogen atom or a monovalent organic group; and $R^{33}$ represents a halogen atom or a group of formula: —$OSO_2Z$, wherein Z represents an alkyl group, a halogenated alkyl group or an aryl group.

13. The process according to claim 1, wherein said monomer comprises 75 to 95 mol % of the compound represented by formula (I) and 5 to 25 mol % of a compound represented by formula (V):

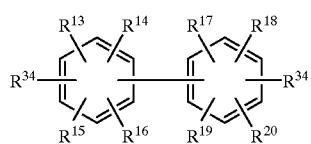
(V)

wherein $R^{13}$, $R^{14}$, $R^{15}$, $R^{16}$, $R^{17}$, $R^{18}$, $R^{19}$, and $R^{20}$, which may be the same or different, each represent a hydrogen atom, a halogen atom, an alkyl group, a halogenated alkyl group or an aryl group; and $R^{34}$ represents a group of formula: —$OSO_2Z$, wherein Z represents an alkyl group, a halogenated alkyl group or an aryl group.

14. The process according to claim 1, wherein said monomer comprises 50 to 95 mol % of the compound represented by formula (I) and 5 to 50 mol % of a compound represented by formula (VI):

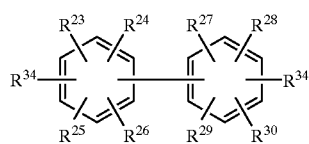
(VI)

wherein $R^{23}$, $R^{24}$, $R^{25}$, $R^{26}$, $R^{27}$, $R^{28}$, $R^{29}$, and $R^{30}$ each represent a hydrogen atom or an allyl group, provided that at least one of $R^{23}$ to $R^{30}$ is an allyl group; and $R^{34}$ represents a halogen atom or a group of formula: —OSO$_2$Z, wherein Z represents an alkyl group, a halogenated alkyl group or an aryl group.

15. The process according to claim 1, wherein X is a group represented by formula: —C(CF$_3$)$_2$—.

16. The process according to claim 1, wherein X is a group represented by formula:

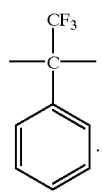

17. The process according to claim 1, wherein X is a fluorenylene group represented by formula:

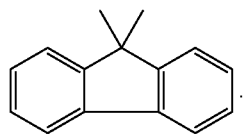

18. A film-forming material comprising a phenylene-containing polymer comprising a repeating unit represented by:

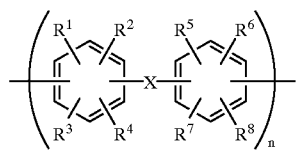

wherein X represents a group of formula: —CYY'—, wherein Y and Y', which may be the same or different, each represent a hydrogen atom, a halogenated alkyl group or an aryl group, or a fluorenylene group; and $R^1$, $R^2$, $R^3$, $R^4$, $R^5$, $R^6$, $R^7$, and $R^8$, which may be the same or different, each represent a hydrogen atom, a halogen atom, an alkyl group, a halogenated alkyl group, an allyl group or an aryl group; n represents a mole fraction of 50 mol % or more; and the phenylene-containing polymer has a weight-average molecular weight of 1,000 to 1,000,000 on polystyrene conversion.

19. The film-forming material according to claim 18, wherein X is a fluorenylene group represented by formula:

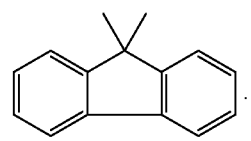

20. The film-forming material according to claim 18, wherein X is a group represented by formula:

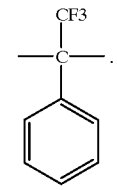

21. The film-forming material according to claim 18, wherein said polymer is represented by formula (VIII):

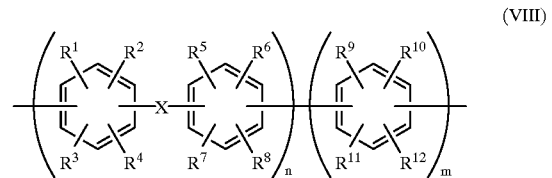
(VIII)

wherein X represents a group of formula: —CYY'—, wherein Y and Y', which may be the same or different, each represent a halogenated alkyl group, a hydrogen atom or an aryl group, or a fluorenylene group; and $R^1$, $R^2$, $R^3$, $R^4$, $R^5$, $R^6$, $R^7$, and $R^8$, which may be the same or different, each represent a hydrogen atom, a halogen atom, an alkyl group, a halogenated alkyl group, an allyl group or an aryl group; $R^9$, $R^{10}$, $R^{11}$, and $R^{12}$, which may be the same or different, each represent a hydrogen atom, a halogen atom, a hydroxy group, or a monovalent organic group; and n and m each represent a mole fraction of 50 to 95 mol % and 5 to 50 mol %, respectively, making a total of 100 mol %, and has a weight-average molecular weight of 1,000 to 1,000,000 on polystyrene conversion.

22. The film-forming material according to claim 21, wherein at least one of $R^9$, $R^{10}$, $R^{11}$, and $R^{12}$ is a monovalent reactive group or a precursor thereof.

23. The film-forming material according to claim 22, wherein said monovalent reactive group or a precursor thereof is selected from the group consisting of a hydroxyl group, a carboxyl group, an allyl group, and an alkoxycarbonyloxy group.

24. The film-forming material according to claim 18, wherein said polymer is represented by formula (IX):

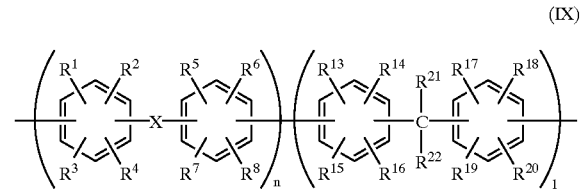
(IX)

wherein X represents a group of formula: —CYY'—, wherein Y and Y', which may be the same or different, each represent a halogenated alkyl group, a hydrogen atom or an aryl group, or a fluorenylene group; and $R^1$, $R^2$, $R^3$, $R^4$, $R^5$, $R^6$, $R^7$, and $R^8$ which may be the same or different, each represent a hydrogen atom, a halogen atom, an alkyl group, a halogenated alkyl group, an allyl group or an aryl group; $R^{21}$ and $R^{22}$ which may be the same or different, each represent an alkyl group or an aryl group, provided that at least one of $R^{21}$ and $R^{22}$ is an alkyl group; $R^{13}$, $R^{14}$, $R^{15}$, $R^{16}$, $R^{17}$, $R^{18}$, $R^{19}$, and $R^{20}$, which may be the same or different, each represent a hydrogen atom, a halogen atom or a monovalent organic group; and n and 1 each represent a mole fraction of 50 to 95 mol % and 5 to 50 mol %, respectively, making a total of 100 mol %, and has a weight-average molecular weight of 1,000 to 1,000,000 on polystyrene conversion.

25. The film-forming material according to claim 18, wherein said polymer is represented by formula (X):

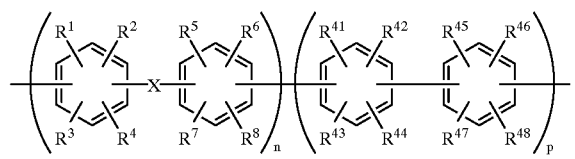

(X)

wherein X represents a group of formula: —CYY'—, wherein Y and Y', which may be the same or different, each represent a halogenated alkyl group, a hydrogen atom or an aryl group, or a fluorenylene group; and $R^{41}$, $R^{42}$, $R^{43}$, $R^{44}$, $R^{45}$, $R^{46}$, $R^{47}$, and $R^{48}$, which may be the same or different, each represent a hydrogen atom, a halogen atom, an alkyl group, a halogenated alkyl group, an allyl group or an aryl group; $R^{13}$, $R^{14}$, $R^{15}$, $R^{16}$, $R^{17}$, $R^{18}$, $R^{19}$, and $R^{20}$, which may be the same or different, each represent a hydrogen atom, a halogen atom or a monovalent organic group; and n and p each represent a mole fraction of 50 to 95 mol % and 5 to 50 mol %, respectively, making a total of 100 mol %, and has a weight-average molecular weight of 1,000 to 1,000,000 on polystyrene conversion.

26. An electrically insulating material comprising the film-forming material according to claim 18.

27. An optical material comprising the film-forming material according to claim 18.

* * * * *